United States Patent
Shim et al.

(10) Patent No.: US 7,991,041 B2
(45) Date of Patent: Aug. 2, 2011

(54) ITERATIVE DETECTION AND CANCELLATION FOR WIRELESS COMMUNICATION

(75) Inventors: Byonghyo Shim, San Diego, CA (US); Farrokh Abrishamkar, San Diego, CA (US); Inyup Kang, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1046 days.

(21) Appl. No.: 11/560,060

(22) Filed: Nov. 15, 2006

(65) Prior Publication Data

US 2008/0112381 A1    May 15, 2008

(51) Int. Cl.
*H04B 1/10* (2006.01)
*H03D 1/04* (2006.01)
(52) U.S. Cl. .................. 375/148; 375/346
(58) Field of Classification Search .......... 375/144, 375/147–148, 231–232, 340, 343, 348, 350, 375/359, 138, 141, 240, 259–260, 285, 316, 375/346–347, 358; 370/479, 280, 310, 319–321, 370/335–336, 342, 343, 344, 345, 347, 441, 370/442; 455/63.1, 67.11, 67.13, 501
See application file for complete search history.

(56) References Cited

U.S. PATENT DOCUMENTS

| | | | |
|---|---|---|---|
| 6,363,103 B1* | 3/2002 | Buehrer et al. | 375/148 |
| 6,667,964 B1 | 12/2003 | Seki et al. | |
| 6,760,315 B1* | 7/2004 | Esmailzadeh et al. | 370/310 |
| 6,956,893 B2* | 10/2005 | Frank et al. | 375/147 |
| 7,190,710 B2* | 3/2007 | Yousef et al. | 375/148 |
| 7,280,585 B2* | 10/2007 | Sriram et al. | 375/148 |
| 7,339,980 B2* | 3/2008 | Grant et al. | 375/148 |
| 7,428,260 B2* | 9/2008 | Yellin | 375/147 |
| 7,477,634 B1* | 1/2009 | McKown | 370/342 |
| 2002/0012264 A1* | 1/2002 | Ishiwara | 365/145 |
| 2004/0146024 A1* | 7/2004 | Li et al. | 370/334 |
| 2005/0174983 A1 | 8/2005 | Naguleswaran et al. | |
| 2007/0110131 A1* | 5/2007 | Guess et al. | 375/148 |
| 2007/0110132 A1* | 5/2007 | Guess et al. | 375/148 |
| 2008/0112382 A1* | 5/2008 | Shim et al. | 370/342 |

FOREIGN PATENT DOCUMENTS

| | | |
|---|---|---|
| WO | WO02073937 | 9/2002 |
| WO | WO2004070958 A2 | 8/2004 |
| WO | WO2004095713 | 11/2004 |

OTHER PUBLICATIONS

Silvester, et al., Analysis of Reverse Link Capcity for Cellular CDMA Systems Emploting Group Succesive Interference Cancelllation, May 7-10, 2006, Vehicular Technology Conference, 2006. VTC 2006-Spring. IEEE 63rd, vol. 5, pp. 2513-2517.*

(Continued)

*Primary Examiner* — Tesfaldet Bocure
*Assistant Examiner* — Lawrence B Williams
(74) *Attorney, Agent, or Firm* — Howard H. Seo; Ramin Mobarhan

(57) ABSTRACT

Techniques for recovering a desired transmission in the presence of interfering transmissions are described. For iterative detection and cancellation, multiple groups of code channels are formed for a plurality of code channels for at least one sector. Processing is performed for the multiple groups of code channels in multiple iterations. For each iteration, data detection and signal cancellation are performed for the multiple groups of code channels in multiple stages, e.g., in a sequential order starting with the strongest group to the weakest group. Each stage of each iteration may perform data detection, signal reconstruction, and signal cancellation. Each stage of each iteration may also perform equalization, data detection, signal reconstruction, and signal cancellation.

31 Claims, 9 Drawing Sheets

OTHER PUBLICATIONS

Bentrica, et al., A Linear Group Polynomial-Expansin Successive Interference Cancellation Detector, Sep. 7-10, 2003, Personal Indoor And Mobile Radio Communications, 2003. MRC 2003. 14th IEEE Proceedings on, vol. 2, pp. 1546-1550.*

Rasmussen et al., A Matrix-algebraic Approach to Succesive Interference Cancellation In CDMA, Jan. 2000, Communications, IEEE Transactions on, vol. 48, Issue 1, pp. 145-151.*

Johansson et al., Linear Group-wise Successive Interference Cancellation in CDMA, Sep. 2-4, 1998, Spread Spectrum Techniques and Applications, 1998, Proceedings., 1998 IEEE 5th International Symposium on, vol. 1, pp. 121-126.*

International Search Report and Written Opinion-PCT/US2007/084750, International Search Authority-European Patent Office-Mar. 31, 2008.

* cited by examiner

ITERATIVE DETECTION AND CANCELLATION FOR WIRELESS COMMUNICATION

BACKGROUND

I. Field

The present disclosure relates generally to communication, and more specifically to techniques for recovering transmission in wireless communication.

II. Background

A wireless multiple-access communication system can concurrently communicate with multiple wireless devices, e.g., cellular phones. Examples of such multiple-access systems include Code Division Multiple Access (CDMA) systems, Time Division Multiple Access (TDMA) systems, Frequency Division Multiple Access (FDMA) systems, and Orthogonal FDMA (OFDMA) systems.

A wireless multiple-access system typically includes many base stations that provide communication coverage for a large geographic area. Each base station may transmit data to one or more wireless devices located within its coverage area. A given wireless device may receive a desired transmission from a serving base station as well as interfering transmissions from nearby base stations. These interfering transmissions are intended for other wireless devices located within the coverage areas of the nearby base stations but act as interference to this given wireless device. The interference hinders the wireless device's ability to recover the desired transmission and has a large impact on performance.

There is therefore a need in the art for techniques to recover a desired transmission in the presence of interfering transmissions in a wireless communication system.

SUMMARY

Techniques for recovering a desired transmission in the presence of interfering transmissions are described herein. In an embodiment, multiple groups of code channels (which are also referred to as user groups) are formed for a plurality of code channels for at least one sector. Each group may include all code channels for one sector, a subset of all code channels for one sector, or multiple code channels for multiple sectors. Processing is performed for the multiple groups of code channels in multiple iterations. For each iteration, data detection and signal cancellation are performed for the multiple groups of code channels in multiple stages, e.g., in a sequential order starting with the first group having the strongest received powers and concluding with the last group having the weakest received powers.

In an embodiment, for each stage of each iteration, data detection is performed to obtain a detected signal for a group of code channels being processed by that stage. A signal for the group of code channels is reconstructed based on the detected signal. The reconstructed signal is canceled to obtain an output signal for the stage. In another embodiment, for each stage of each iteration, equalization is performed to obtain an equalized signal for a group of code channels being processed by that stage. Data detection is then performed on the equalized signal to obtain a detected signal for the group of code channels. A signal for the group of code channels is reconstructed based on the detected signal. The reconstructed signal is canceled to obtain an output signal for the stage.

Causal cancellation or both causal and non-causal cancellation may be performed prior to the iterative processing. Various details of the cancellation and the iterative processing are described below. Various aspects and embodiments of the disclosure are also described in further detail below.

DETAILED DESCRIPTION

The techniques described herein may be used for various communication systems such as CDMA, TDMA, FDMA, OFDMA, and Single-Carrier FDMA (SC-FDMA) systems. A CDMA system may implement a radio technology such as cdma2000, Wideband-CDMA (W-CDMA), and so on. cdma2000 covers IS-2000, IS-856, and IS-95 standards. A TDMA system may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. An OFDMA system utilizes OFDM to transmit symbols in the frequency domain on orthogonal frequency subcarriers. An SC-FDMA system transmits symbols in the time domain on orthogonal frequency subcarriers. For clarity, the techniques are described below for a CDMA system, which may be a cdma2000 system or a W-CDMA system.

Figure 1:
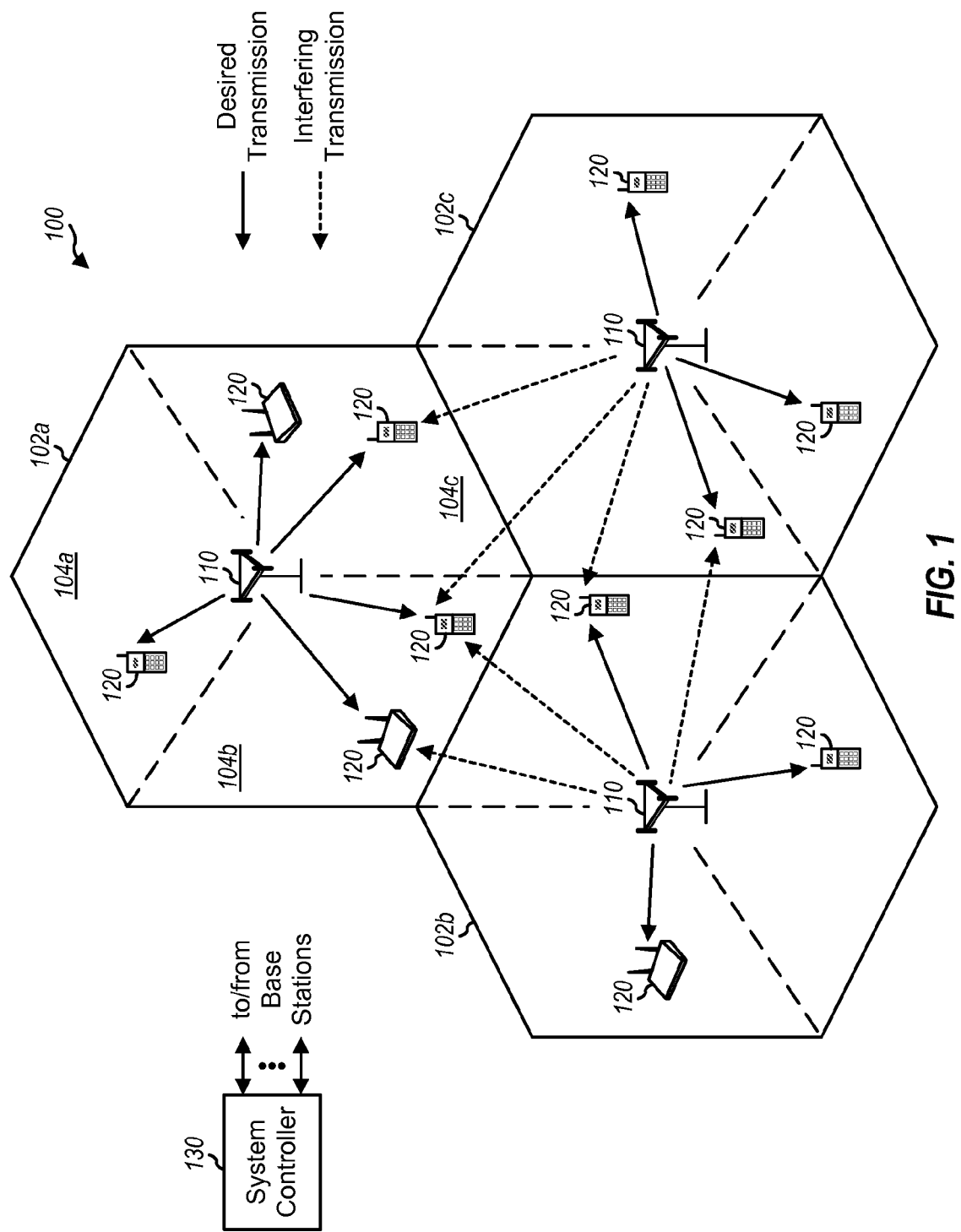
FIG. 1 shows a CDMA system.

FIG. 1 shows a CDMA system 100 with multiple base stations 110 and multiple wireless devices 120. A base station is generally a fixed station that communicates with the wireless devices and may also be called a Node B, an access point, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. A system controller 130 couples to base stations 110 and provides coordination and control for these base stations.

The techniques described herein may be used for systems with sectorized cells as well as systems with un-sectorized cells. In the following description, the term "sector" can refer to (1) a BTS and/or its coverage area for a system with sectorized cells and (2) a base station and/or its coverage area for a system with un-sectorized cells. The terms "sector" and "base station" are used interchangeably herein.

Wireless devices 120 are typically dispersed throughout the system, and each wireless device may be stationary or mobile. A wireless device may also be called a mobile station, a user equipment, a terminal, a station, a subscriber unit, or some other terminology. A wireless device may be a cellular phone, a personal digital assistant (PDA), a wireless modem card, a handheld device, a laptop computer, and so on. A wireless device may communicate with zero, one, or multiple base stations on the forward and reverse links at any given moment. The forward link (or downlink) refers to the communication link from the base stations to the terminals, and the reverse link (or uplink) refers to the communication link from the terminals to the base stations. For simplicity, FIG. 1 shows only transmissions on the forward link.

Figure 2:
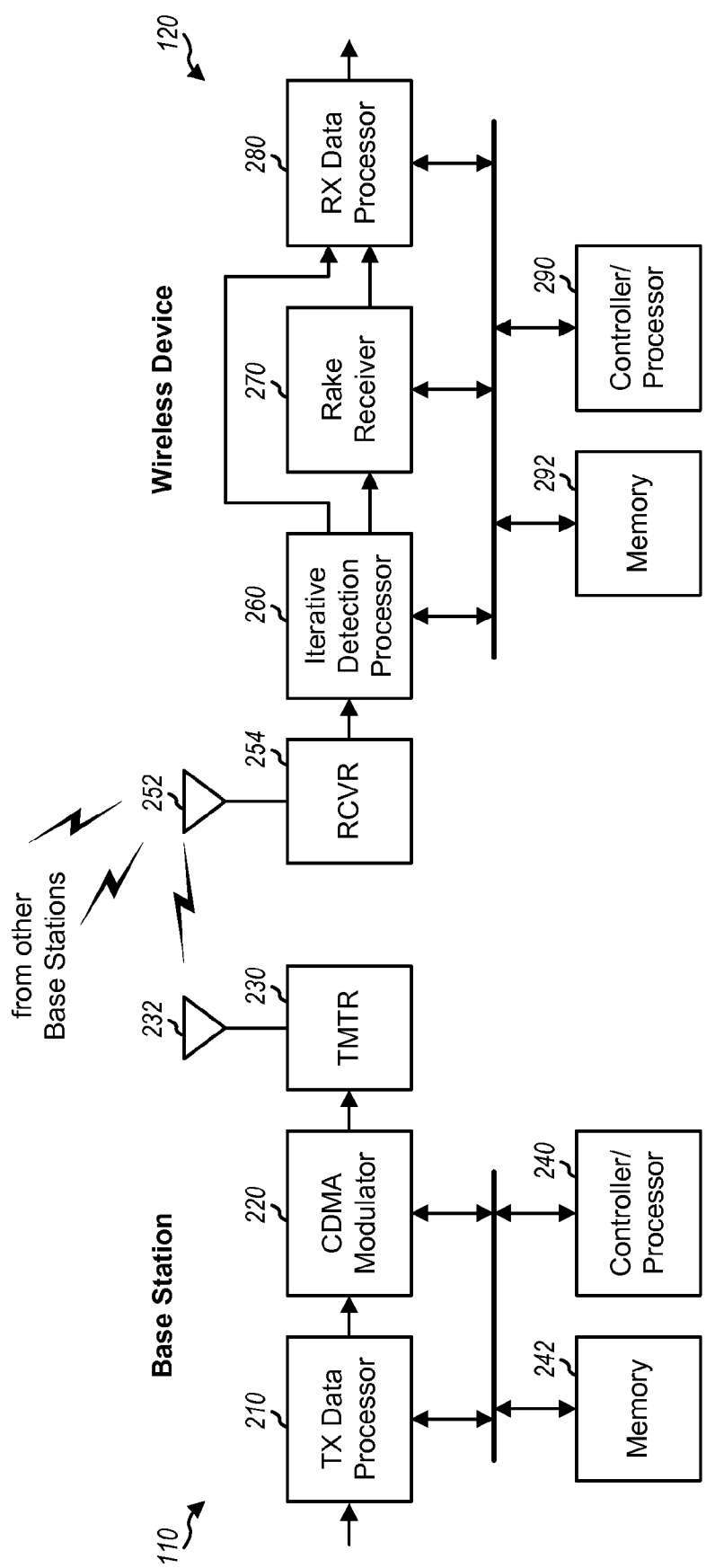
FIG. 2 shows a block diagram of a base station and a wireless device.

FIG. 2 shows a block diagram of a base station 110 and a wireless device 120, which may be one of the base stations and one of the wireless devices shown in FIG. 1. For simplicity, FIG. 2 shows base station 110 having one transmit antenna and wireless device 120 having one receive antenna. In general, base station 110 and wireless device 120 may each be equipped with any number of antennas. For simplicity, FIG. 2 shows only the processing units for data transmission on the forward link.

At base station 110, a transmit (TX) data processor 210 receives traffic data for the wireless devices being served, processes (e.g., encodes, interleaves, and symbol maps) the traffic data to generate data symbols, and provides the data symbols to a CDMA modulator 220. As used herein, a data symbol is a modulation symbol for data, a pilot symbol is a modulation symbol for pilot, a modulation symbol is a complex value for a point in a signal constellation (e.g., for M-PSK or M-QAM), a symbol is generally a complex value, and pilot is data that is known a priori by both the base stations and the wireless devices. CDMA modulator 220 processes the data symbols and pilot symbols as described below and provides output chips. A transmitter (TMTR) 230 processes (e.g., converts to analog, amplifies, filters, and frequency upconverts) the output chip stream and generates a forward link signal, which is transmitted from an antenna 232.

At wireless device 120, an antenna 252 receives the forward link signals from base station 110 as well as other base stations and provides a received signal. A receiver (RCVR) 254 processes (e.g., filters, amplifies, frequency downconverts, and digitizes) the received signal and provides received samples to a processor 260. Processor 260 may perform iterative detection and cancellation, as described below. Antenna 252 may receive the forward link signal from base station 110 via one or more signal paths, and the received signal may include one or more signal instances (or multipaths) for base station 110. Rake receiver 270 may be used to process all multipaths of interest. Processor 260 or rake receiver 270 provides data symbol estimates, which are estimates of the data symbols sent by base station 110 to wireless device 120. A receive (RX) data processor 280 processes (e.g., symbol demaps, deinterleaves, and decodes) the data symbol estimates and provides decoded data. In general, the processing by processor 260/rake receiver 270 and RX data processor 280 is complementary to the processing by CDMA modulator 220 and TX data processor 210, respectively, at base station 110.

Controllers/processors 240 and 290 direct operation at base station 110 and wireless device 120, respectively.

Memories 242 and 292 store data and program codes for base station 110 and wireless device 120, respectively.

In CDMA, multiple orthogonal code channels may be obtained with different orthogonal codes. The code channels may also be referred to as traffic channels, physical channels, data channels, and so on. For example, multiple orthogonal traffic channels are obtained with different Walsh codes in cdma2000, and multiple orthogonal physical channels are obtained with different orthogonal variable spreading factor (OVSF) codes in W-CDMA. The code channels may be used to send different types of data (e.g., traffic data, broadcast data, control data, pilot, and so on) and/or traffic data for different users. Data for the code channels is scaled, combined, and spectrally spread across the entire system bandwidth. The spectral spreading is performed with a spreading code, which is a pseudo-random number (PN) code in cdma2000 and a scrambling code in W-CDMA. In cdma2000, the channelization with Walsh codes is called "covering", and the spectral spreading is called "spreading". In W-CDMA, the channelization with OVSF codes is called "spreading", and the spectral spreading is called "scrambling". For clarity, cdma2000 terminology (e.g., covering, spreading, Walsh codes, and PN code) is used in the following description.

Figure 3:
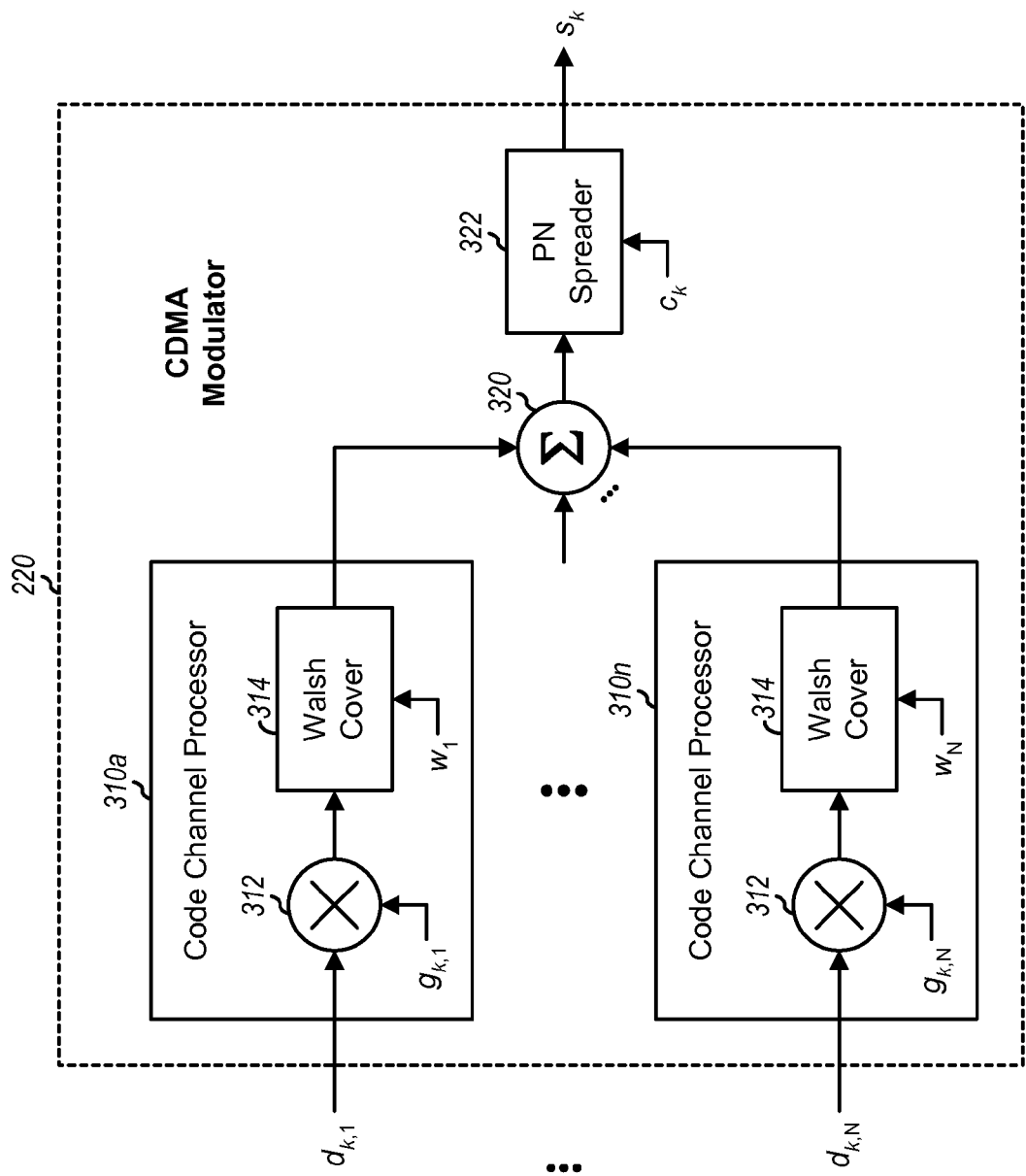
FIG. 3 shows a block diagram of a CDMA modulator.

FIG. 3 shows a block diagram of CDMA modulator 220 within base station 110. For simplicity, the following description assumes that N code channels are available for each sector, and each code channel is assigned a different Walsh code of length N, where N may be equal to 16, 32, 64, 128, 256, or some other value. In general, orthogonal codes of different lengths may be used for the code channels, and N may correspond to the length of the longest orthogonal code. For simplicity, the following description assumes that the N code channels are for N users, and the terms "code channels" and "users" are used interchangeably. In actuality, some code channels are used for overhead, e.g., pilot, control data, broadcast data, etc.

CDMA modulator 220 includes N code channel processors 310a through 310n for the N code channels. Within each code channel processor 310, a multiplier 312 receives and scales the data or pilot symbols for code channel n of sector k with a gain of $g_{k,n}$ and provides scaled symbols. The gain $g_{k,n}$ may be set to zero if code channel n is not used by sector k. A Walsh cover unit 314 channelizes the scaled symbols with a Walsh code $w_n$ for code channel n. Unit 314 performs covering by repeating each scaled symbol to generate N replicated symbols and multiplying the N replicated symbols with the N chips of Walsh code $w_n$ to generate N data chips for that scaled symbol. A combiner 320 receives and adds the data chips for all N code channels. A PN spreader 322 multiplies the combined data chips with a PN code $c_k$ assigned to sector k and generates output chips.

The output chips for sector k in one symbol period may be expressed in matrix form as follows:

$$\underline{s}_k = \underline{C}_k W G_k \underline{d}_k = A_k \underline{d}_k, \qquad \text{Eq (1)}$$

where $\underline{d}_k$ is an N×1 vector of data symbols sent on the N code channels of sector k, $G_k$ is an N×N diagonal matrix of gains for the N code channels of sector k, W is an N×N Hadamard matrix containing N Walsh codes in N columns, $\underline{C}_k$ is an N×N diagonal matrix containing N chips of the PN code for sector k, $A_k$ is an N×N processing matrix for data vector $\underline{d}_k$, and $\underline{s}_k$ is an N×1 vector of output chips for sector k.

For clarity, vectors are denoted with bolded and underlined lower case text (e.g., $\underline{\mathbf{d}}$), and matrices are denoted with bolded and underlined upper case text (e.g., $\underline{\mathbf{G}}$). A diagonal matrix contains possible non-zero values along the diagonal and zeros elsewhere.

Vector $\underline{\mathbf{d}}_k$ contains N data symbols to be sent simultaneously on N code channels in one symbol period. Matrix $\underline{\mathbf{G}}_k$ contains N gains for the N code channels along the diagonal and zeros elsewhere. The N gains determine the amount of transmit power used for the N code channels. Matrix $\underline{\mathbf{W}}$ contains N Walsh codes for the N code channels in N columns. If the code channels have different Walsh code lengths, then N is equal to the longest Walsh code length for all code channels, and each shorter Walsh code is repeated in matrix $\underline{\mathbf{W}}$. Since the same Walsh matrix $\underline{\mathbf{W}}$ is used for all sectors, subscript k is not used for $\underline{\mathbf{W}}$. Matrix $\underline{\mathbf{C}}_k$ contains N PN chips along the diagonal and zeros elsewhere. These PN chips are from the PN code for sector k for one symbol period. Vector $\underline{\mathbf{s}}_k$ contains N output chips transmitted by sector k for all N code channels in one symbol period.

Matrix $\underline{\mathbf{A}}_k$ represents all of the processing observed by data vector $\underline{\mathbf{d}}_k$ and may be expressed as:

$$\underline{\mathbf{A}}_k = \underline{\mathbf{C}}_k \underline{\mathbf{W}} \underline{\mathbf{G}}_k. \qquad \text{Eq (2)}$$

The columns of $\underline{\mathbf{A}}_k$ represent code channels/users, and the rows of $\underline{\mathbf{A}}_k$ represent time.

Wireless device 120 receives the forward link signals from K sectors, which include the serving sector as well as interfering sectors. In general, K may be any value. The received signal for each sector k, without noise, may be expressed as:

$$\underline{\mathbf{x}}_k = \underline{\mathbf{H}}_k \underline{\mathbf{C}}_k \underline{\mathbf{W}} \underline{\mathbf{G}}_k \underline{\mathbf{d}}_k = \underline{\mathbf{H}}_k \underline{\mathbf{A}}_k \underline{\mathbf{d}}_k = \underline{\mathbf{H}}_k \underline{\mathbf{s}}_k, \qquad \text{Eq (3)}$$

where $\underline{\mathbf{H}}_k$ is an $(N+\Delta) \times N$ channel response matrix for sector k,
$\underline{\mathbf{x}}_k$ is an $(N+\Delta) \times 1$ vector of received samples for sector k, and
$\Delta$ is the delay spread of the wireless channel, in units of chips.

Matrix $\underline{\mathbf{H}}_k$ contains channel gains for sector k along the diagonal and zeros elsewhere. Vector $\underline{\mathbf{x}}_k$ contains $N+\Delta$ received samples for sector k for one symbol period, in the absence of noise. For simplicity, the description herein is for the case in which $\underline{\mathbf{d}}_k$ covers one symbol period. $\underline{\mathbf{d}}_k$ may also cover multiple symbol periods (e.g., the previous, current, and next symbol periods) to account for intersymbol interference (ISI). In this case, the dimensions of the other matrices would increase correspondingly.

The received samples at wireless device 120 for all K sectors may be expressed as:

$$\underline{\mathbf{y}} = \sum_{k=1}^{K} \underline{\mathbf{x}}_k + \underline{\mathbf{n}} = \sum_{k=1}^{K} \underline{\mathbf{H}}_k \underline{\mathbf{A}}_k \underline{\mathbf{d}}_k + \underline{\mathbf{n}} = \sum_{k=1}^{K} \underline{\mathbf{H}}_k \underline{\mathbf{s}}_k + \underline{\mathbf{n}}, \qquad \text{Eq (4)}$$

where $\underline{\mathbf{y}}$ is an $(N+\Delta) \times 1$ vector of received samples at wireless device 120, and
$\underline{\mathbf{n}}$ is an $(N+\Delta) \times 1$ vector of noise at wireless device 120.

For simplicity, the noise may be assumed to be additive white Gaussian noise (AWGN) with a zero mean vector and a covariance matrix of $\sigma_n^2 \underline{\mathbf{I}}$, where $\sigma_n^2$ is the variance of the noise, and $\underline{\mathbf{I}}$ is the identity matrix with ones along the diagonal and zeros elsewhere.

Wireless device 120 may perform iterative detection and cancellation to recover one or more transmissions from one or more sectors. For iterative detection and cancellation, the users in the K sectors (or the code channels for the K sectors) are processed iteratively multiple times to improve performance. For each iteration, the users in the K sectors are processed in multiple stages. Each stage performs detection and cancellation for one group of users and provides a canceled output to the next stage. The user groups may be sorted based on received powers. For each iteration, the first stage may process the strongest user group, the second stage may process the second strongest user group, and so on, and the last stage may process the weakest user group. Each stage may process a user group using various techniques, as described below.

The users in the K sectors may be arranged into M groups, where M may be any integer value. In general, each user group may include any number of users and any of the users in the K sectors. In an embodiment, each group contains a predetermined number of users, e.g., L users, where L may be any integer value. The user groups may be formed in various manners.

In an embodiment, which is referred to as sector-based processing, each group includes all users in one sector. In this embodiment, M user groups may be formed, with each user group containing L users in one sector, where M=K and L=N. The K sectors may be sorted from strongest to weakest. The first group may contain all users in the strongest sector, the second group may contain all users in the next strongest sector, and so on, and the last group may contain all users in the weakest sector.

In another embodiment, which is referred to as global processing, the received powers for all users in all sectors are determined. The users are then sorted from strongest to weakest and stored in a list. The first group may contain L strongest users in the list, the second group may contain the L next strongest users, and so on, and the last group may contain the L weakest users in the list. In this embodiment, a given group may contain users in the same sector or different sectors.

In yet another embodiment, which is referred to as local processing, each group contains a subset of the users in one sector. The users may be sorted based on their received powers. The first group may contain the L strongest users in the same sector, the second group may contain the L strongest remaining users in the same sector, and so on.

The received signal for user group m, without noise, may be expressed as:

$$\underline{\mathbf{x}}_m = \underline{\mathbf{H}}_m \underline{\mathbf{C}}_m \underline{\mathbf{W}}_m \underline{\mathbf{G}}_m \underline{\mathbf{d}}_m = \underline{\mathbf{H}}_m \underline{\mathbf{A}}_m \underline{\mathbf{d}}_m = \underline{\mathbf{T}}_m \underline{\mathbf{d}}_m, \qquad \text{Eq (5)}$$

where $\underline{\mathbf{d}}_m$ is an $L \times 1$ data vector for the L users in group m,
$\underline{\mathbf{G}}_m$ is an $L \times L$ gain matrix for the users in group m,
$\underline{\mathbf{W}}_m$ is an $N \times L$ matrix of Walsh codes for the users in group m,
$\underline{\mathbf{C}}_m$ is an $N \times N$ PN matrix for the users in group m
$\underline{\mathbf{H}}_m$ is an $(N+\Delta) \times N$ channel response matrix for the users in group m,
$\underline{\mathbf{T}}_m$ is an $(N+\Delta) \times L$ system matrix for data vector $\underline{\mathbf{d}}_m$, and
$\underline{\mathbf{x}}_m$ is an $(N+\Delta) \times 1$ vector of received samples for user group m.

Vector $\underline{\mathbf{d}}_m$ and matrices $\underline{\mathbf{G}}_m$ and $\underline{\mathbf{W}}_m$ contain the data symbols, the gains, and the Walsh codes, respectively, for the users in group m. These users may belong in the same sector or different sectors. Matrix $\underline{\mathbf{W}}_m$ may contain duplicate columns if multiple users in group m are assigned code channels with the same Walsh code. $\underline{\mathbf{C}}_m$ contains PN chips for all sectors transmitting to the users in group m. $\underline{\mathbf{H}}_m$ contains complex channel gains for the users in group m. If the users in group m belong in one sector, then $\underline{\mathbf{C}}_m$ and $\underline{\mathbf{H}}_m$ contain PN chips and channel gains for one sector. If the users in group m belong in multiple sectors, then $\underline{\mathbf{C}}_m$ and $\underline{\mathbf{H}}_m$ are block diagonal matrices containing PN chips and channel gains for these multiple sectors, one diagonal channel gain matrix and one diagonal PN matrix for each sector. $\underline{x}_m$ contains the received samples for all users in group m in the absence of noise.

The system matrix for user group m may be given as:

$$\underline{T}_m = \underline{H}_m \underline{C}_m \underline{W}_m \underline{G}_m. \qquad \text{Eq (6)}$$

System matrix $\underline{T}_m$ represents all of the processing as well as the channel response observed by data vector $\underline{d}_m$. The height of $\underline{T}_m$ is related to time (in number of chips), and the width of $\underline{T}_m$ is determined by the number of users in group m. A single system matrix $\underline{T}$ may be defined for all M·L users in all K sectors. However, the processing for this single large system matrix $\underline{T}$ would be computationally intensive.

The received samples at wireless device 120 for the M user groups may be expressed as:

$$\underline{y} = \sum_{m=1}^{M} \underline{x}_m + \underline{n} = \sum_{m=1}^{M} \underline{T}_m \underline{d}_m + \underline{n}. \qquad \text{Eq (7)}$$

For the first iteration, each stage performs data detection based on its input signal and obtains a detected signal for the user group being processed by that stage. Each stage also reconstructs the signal for its user group and subtracts the reconstructed signal from its input signal to obtain an output signal for this stage, which is an input signal for the next stage. As an example, for the case in which M=3, the received signal may be expressed as:

$$\underline{y} = \underline{T}_1 \underline{d}_1 + \underline{T}_2 \underline{d}_2 + \underline{T}_3 \underline{d}_3 + \underline{n}. \qquad \text{Eq (8)}$$

The received signal $\underline{y}$ is the input signal $\underline{y}_{1,0}$ for the first stage of the first iteration, or $\underline{y}_{1,0} = \underline{y}$.

In the first iteration, the processing by the three stages for three user groups may be expressed as:

$$\underline{y}_{1,1} = \underline{y}_{1,0} - \underline{T}_1 \hat{\underline{d}}_{1,1} = \underline{e}_{1,1} + \underline{T}_2 \underline{d}_2 + \underline{T}_3 \underline{d}_3 + \underline{n},$$

$$\underline{y}_{1,2} = \underline{y}_{1,1} - \underline{T}_2 \hat{\underline{d}}_{1,2} = \underline{e}_{1,1} + \underline{e}_{1,2} + \underline{T}_3 \underline{d}_3 + \underline{n}, \text{ and}$$

$$\underline{y}_{1,3} = \underline{y}_{1,2} - \underline{T}_3 \hat{\underline{d}}_{1,3} = \underline{e}_{1,1} + \underline{e}_{1,2} + \underline{e}_{1,3} + \underline{n}, \qquad \text{Eq (9)}$$

where $\hat{\underline{d}}_{1,1}$ to $\hat{\underline{d}}_{1,3}$ are detected signals for user groups 1 to 3, respectively, $\underline{y}_{1,1}$ to $\underline{y}_{1,3}$ are output signals from stages 1 to 3, respectively, and $\underline{e}_{1,1}$ to $\underline{e}_{1,3}$ are residual errors for user groups 1 to 3, respectively.

Each line in equation set (9) represents the processing by one stage. Each stage m performs data detection to obtain $\hat{\underline{d}}_{1,m}$, then reconstructs the signal for user group m as $\underline{T}_m \hat{\underline{d}}_{1,m}$, and then subtracts the reconstructed signal from the input signal $\underline{y}_{1,m-1}$ to obtain the output signal $\underline{y}_{1,m}$. The residual error $\underline{e}_{1,m}$ is the difference between the actual signal and the reconstructed signal, or $\underline{e}_{1,m} = \underline{T}_m \underline{d}_{1,m} - \underline{T}_m \hat{\underline{d}}_{1,m}$.

A second iteration may then be performed for the three user groups. The output signal $\underline{y}_{1,3}$ from the last stage of the first iteration is used as the input signal $\underline{y}_{2,0}$ for the first stage of the second iteration, or $\underline{y}_{2,0} = \underline{y}_{1,3}$.

In the second iteration, the first stage may add the reconstructed signal for the first user group back to the input signal, as follows:

$$\underline{r}_{2,1} = \underline{y}_{2,0} + \underline{T}_1 \hat{\underline{d}}_{1,1} = \underline{T}_1 \underline{d}_1 + \underline{e}_{1,2} + \underline{e}_{1,3} + \underline{n} \qquad \text{Eq (10)}$$

where $\underline{r}_{2,1}$ is a reconstituted signal containing the signal for the first user group as well as residual errors for the other user groups and noise. The first user group's signal in $\underline{r}_{2,1}$ will likely have higher quality than in $\underline{y}$ because $\underline{r}_{2,1}$ contains residual errors instead of actual signals for the other user groups.

The first stage performs data detection on the reconstituted signal $\underline{r}_{2,1}$ to obtain an improved detected signal for the first user group. The signal due to the first user group may be reconstructed and canceled from the reconstituted signal to obtain the output signal for the first stage, which is an input signal for the next stage.

For the second iteration, the processing by the three stages for the three user groups may be expressed as:

$$\underline{r}_{2,1} = \underline{y}_{2,0} + \underline{T}_1 \hat{\underline{d}}_{1,1} = \underline{T}_1 \underline{d}_1 + \underline{e}_{1,2} + \underline{e}_{1,3} + \underline{n} \text{ and } \underline{y}_{2,1} = \underline{r}_{2,1} - \underline{T}_1 \hat{\underline{d}}_{2,1} = \underline{e}_{2,1} + \underline{e}_{1,2} + \underline{e}_{1,3} + \underline{n},$$

$$\underline{r}_{2,2} = \underline{y}_{2,1} + \underline{T}_2 \hat{\underline{d}}_{1,2} = \underline{e}_{2,1} + \underline{T}_2 \underline{d}_2 + \underline{e}_{1,3} + \underline{n} \text{ and } \underline{y}_{2,2} = \underline{r}_{2,2} - \underline{T}_2 \hat{\underline{d}}_{2,2} = \underline{e}_{2,1} + \underline{e}_{2,2} + \underline{e}_{1,3} + \underline{n},$$

$$\underline{r}_{2,3} = \underline{y}_{2,2} + \underline{T}_3 \hat{\underline{d}}_{1,3} = \underline{e}_{2,1} + \underline{e}_{2,2} + \underline{T}_3 \underline{d}_3 + \underline{n} \text{ and } \underline{y}_{2,3} = \underline{r}_{2,3} - \underline{T}_3 \hat{\underline{d}}_{2,3} = \underline{e}_{2,1} + \underline{e}_{2,2} + \underline{e}_{2,3} + \underline{n}, \qquad \text{Eq (11)}$$

where $\underline{r}_{2,1}$ to $\underline{r}_{2,3}$ are reconstituted signals for stages 1 to 3, respectively, $\hat{\underline{d}}_{2,1}$ to $\hat{\underline{d}}_{2,3}$ are detected signals for user groups 1 to 3, respectively, $\underline{y}_{2,1}$ to $\underline{y}_{2,3}$ are output signals from stages 1 to 3, respectively, and $\underline{e}_{2,1}$ to $\underline{e}_{2,3}$ are residual errors for user groups 1 to 3, respectively.

Each line in equation set (11) represents the processing by one stage. Each stage m generates the reconstituted signal $\underline{r}_{2,m}$ by adding back the reconstructed signal $\underline{T}_m \hat{\underline{d}}_{1,m}$ from the prior iteration, then performs data detection to obtain $\hat{\underline{d}}_{2,m}$, then reconstructs the signal for user group m as $\underline{T}_m \hat{\underline{d}}_{2,m}$, and then subtracts the reconstructed signal from the reconstituted signal $\underline{r}_{2,m}$ to obtain the output signal $\underline{y}_{2,m}$. The residual error is the difference between the actual signal and the newly reconstructed signal, or $\underline{e}_{2,m} = \underline{T}_m \underline{d}_{1,m} - \underline{T}_m \hat{\underline{d}}_{2,m}$. The detected signal $\hat{\underline{d}}_{2,m}$ in the second iteration should be more accurate than the detected signal $\hat{\underline{d}}_{1,m}$ in the first iteration. Hence, the residual error $\underline{e}_{2,m}$ in the second iteration should be smaller than the residual error $\underline{e}_{1,m}$ in the first iteration.

In general, any number of iterations may be performed for the M user groups. The output signal from the last stage of a given iteration i may be used as the input signal for the first stage of the next iteration i+1. For each stage in the second iteration and later, the reconstructed signal for a user group is added back to the input signal for that stage to obtain the reconstituted signal. For each stage in each iteration, the signal for a user group is detected, reconstructed, and subtracted from the input/reconstituted signal for that stage to obtain the output signal for the next stage. The signal quality generally improves after each iteration. Hence, the detected signals are generally more accurate after each iteration.

Figure 4:
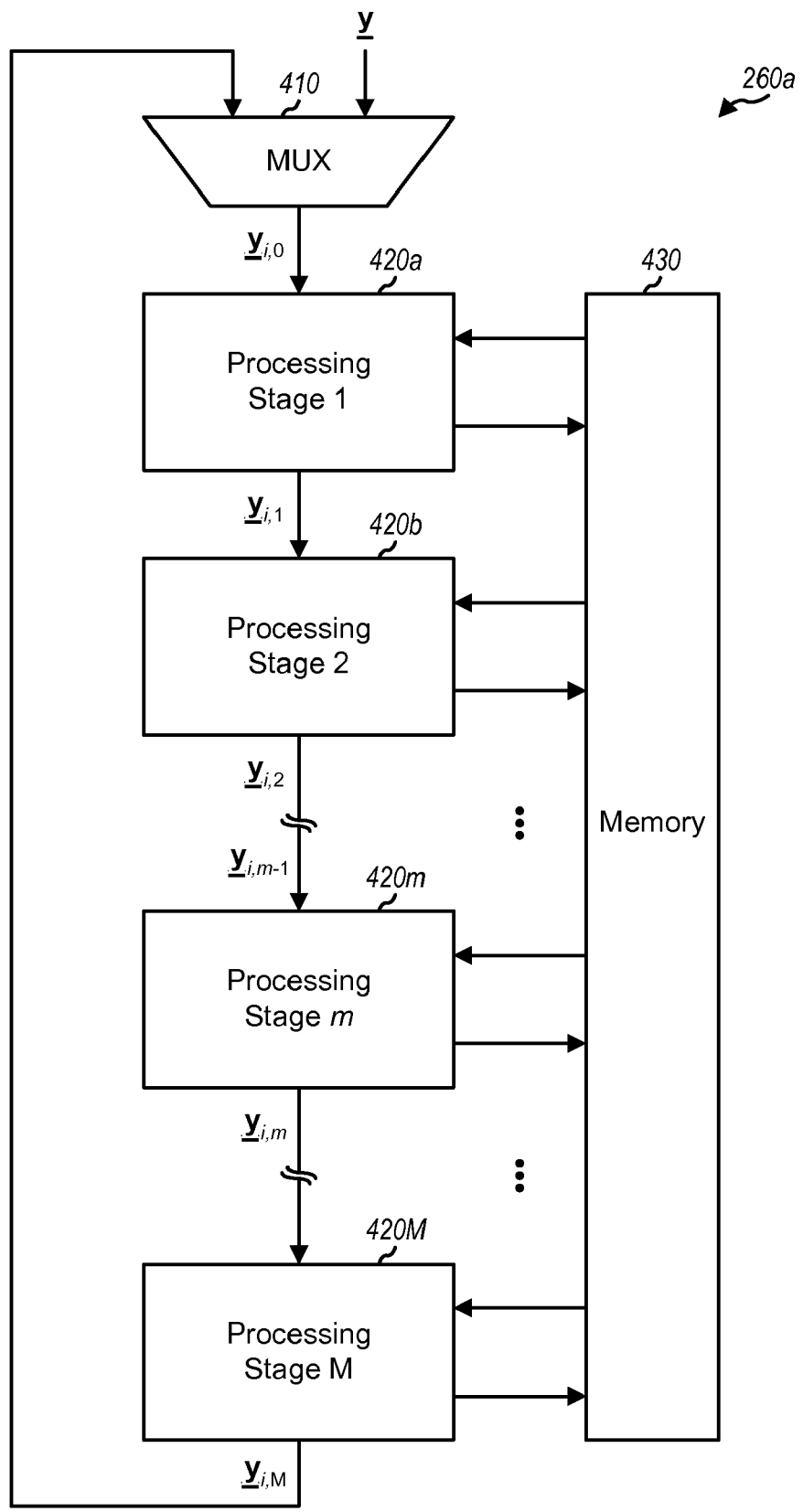
FIG. 4 shows a processor for iterative detection and cancellation.

FIG. 4 shows a block diagram of a processor 260a for iterative detection and cancellation, which is an embodiment of processor 260 in FIG. 2. Processor 260a includes M processing stages 420a through 420M for M user groups. For sector-based processing, each stage performs processing for one sector. M may be equal to K if all sectors are processed or may be less than K if fewer sectors are processed, e.g., if weak sectors are skipped.

A multiplexer 410 is provided with the received signal $\underline{y}$ on one input and the output signal $\underline{y}_{i,M}$ from the last stage 420M on the other input, where subscript i denotes the iteration number. Multiplexer 410 provides the received signal $\underline{y}$ for the first iteration and provides the output signal $\underline{y}_{i,M}$ for each subsequent iteration.

The M stages 420a through 420M are coupled in cascaded, with the output of each stage being provided to the input of the next stage. Each stage 420 derives the reconstituted signal $\underline{r}_{i,m}$ based on its input signal $\underline{y}_{i,m-1}$, performs data detection on the reconstituted signal to obtain the detected signal $\hat{\underline{d}}_{i,m}$ for user group m being processed by that stage. Each stage 420 also reconstructs the signal for user group m and subtracts the reconstructed signal $\hat{\underline{x}}_{i,m}$ from the reconstituted signal to obtain the output signal $\underline{y}_{i,m}$ for the stage.

A memory 430 stores intermediate results from the M stages, e.g., the detected signals, reconstructed signals, etc. The intermediate results may be stored in the forms of chips, symbols, etc. Memory 430 provides the intermediate results to the M stages as needed.

Each stage may perform processing for its user group using various techniques such as a detection and cancellation technique and an equalization, detection and cancellation technique. These techniques are described below.

Figure 5:
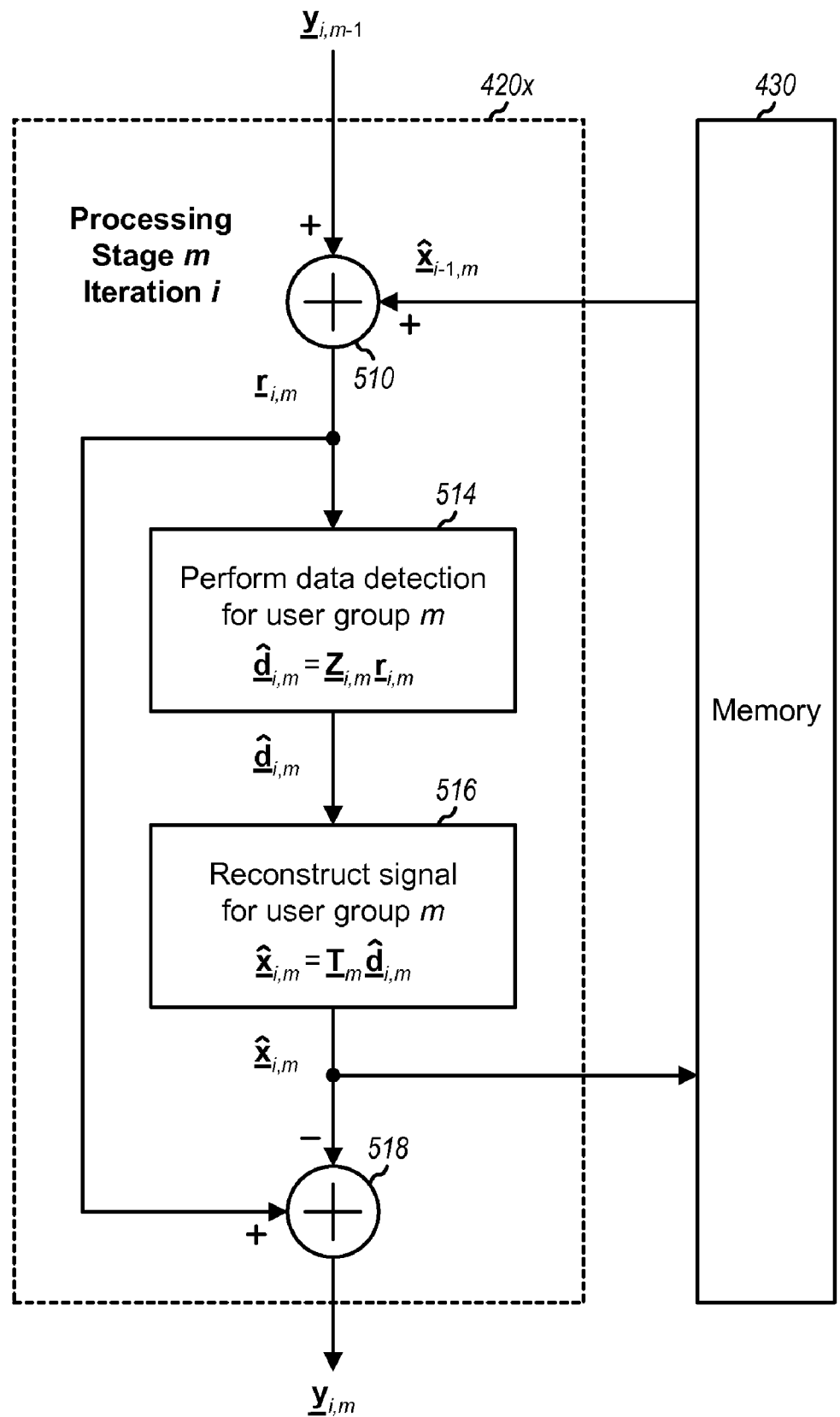
FIG. 5 shows a stage that performs detection and cancellation.

FIG. 5 shows an embodiment of a stage 420x that performs detection and cancellation. Stage 420x may be used for each of the M stages 420a through 420M in FIG. 4. In the following description, stage 420x is referred to as stage m and performs processing for user group m.

Within stage m, a summer 510 receives the input signal $\underline{y}_{i,m-1}$ for stage m and the reconstructed signal $\hat{\underline{x}}_{i-1,m}$ for stage m from the prior iteration. Summer 510 sums the two signals and provides the reconstituted signal $\underline{r}_{i,m}$ for stage m, which may be expressed as:

$$\underline{r}_{i,m} = \underline{y}_{i,m-1} + \hat{\underline{x}}_{i-1,m}, \quad \text{Eq (12)}$$

where $$\hat{\underline{x}}_{i-1,m} = \begin{cases} 0 & \text{for } i = 1 \\ \underline{T}_m \hat{\underline{d}}_{i-1,m} & \text{for } i > 1 \end{cases}.$$

For the first iteration, the input signal $\underline{y}_{i,m-1}$ contains the signal for user group m, $\hat{\underline{x}}_{i-1,m}$ is equal to zero, and the reconstituted signal is equal to the input signal, or $\underline{r}_{i,m} = \underline{y}_{i,m-1}$. For each subsequent iteration, the input signal contains the residual error $\underline{e}_{i-1,m}$ for user group m, and the reconstructed signal $\hat{\underline{x}}_{i-1,m}$ for user group m from the prior iteration i−1 is added back to the input signal $\underline{y}_{i,m-1}$ to obtain the reconstituted signal $\underline{r}_{i,m}$, which then contains the signal for user group m.

A block 514 performs data detection on the reconstituted signal $\underline{r}_{i,m}$ and provides the detected signal $\hat{\underline{d}}_{i,m}$ for user group m. Data detection may be performed in various manners, as described below. A block 516 reconstructs the signal for user group m based on the detected signal and provides the reconstructed signal $\hat{\underline{x}}_{i,m}$ for user group m, which may be expressed as:

$$\hat{\underline{x}}_{i,m} = \underline{T}_m \hat{\underline{d}}_{i,m}. \quad \text{Eq (13)}$$

A summer 518 subtracts the reconstructed signal from the reconstituted signal and provides the output signal $\underline{y}_{i,m}$ for stage m, which may be expressed as:

$$\underline{y}_{i,m} = \underline{r}_{i,m} - \hat{\underline{x}}_{i,m}. \quad \text{Eq (14)}$$

The reconstituted signal $\underline{r}_{i,m}$ for stage m in iteration i may be expressed as:

$$\underline{r}_{i,m} = \underline{T}_m \underline{d}_m + \underline{v}_{i,m}, \quad \text{Eq (15)}$$

where $\underline{v}_{i,m}$ is the total noise and interference for stage m in iteration i.

The total noise and interference $\underline{v}_{i,m}$ may be expressed as:

$$\underline{v}_{1,m} = \sum_{j=1}^{m-1} \underline{e}_{1,j} + \sum_{j=m+1}^{M} \underline{T}_j \underline{d}_j + \underline{n} \text{ for the first iteration, and} \quad \text{Eq (16)}$$

$$\underline{v}_{i,m} = \sum_{j=1}^{m-1} \underline{e}_{i,j} + \sum_{j=m+1}^{M} \underline{e}_{i-1,j} + \underline{n} \text{ for iteration } i > 1. \quad \text{Eq (17)}$$

For the first iteration, $\underline{v}_{i,m}$ contains residual errors $\underline{e}_{1,j}$ for user groups 1 through m−1 that have been canceled in prior stages as well as signals $\underline{T}_j \underline{d}_j$ for user groups m+1 through M to be processed in later stages. For each subsequent iteration, $\underline{v}_{i,m}$ contains residual errors $\underline{e}_{i,j}$ for user groups 1 through m−1 from the current iteration i as well as residual errors $\underline{e}_{i-1,j}$ for user groups m+1 through M from the prior iteration i−1.

Data detection may be performed on the reconstituted signal using linear minimum mean square error (MMSE), least squares (LS), or some other data detection technique. Data detection may be performed for user group m based on the linear MMSE technique, as follows:

$$\hat{\underline{d}}_{i,m} = \underline{R}_{dd,m} \underline{T}_m^H (\underline{T}_m \underline{R}_{dd,m} \underline{T}_m^H + \underline{R}_{vv,i,m})^{-1} \underline{r}_{i,m}, \quad \text{Eq (18)}$$

where $\underline{R}_{dd,m} = E\{\underline{d}_m \underline{d}_m^H\}$ is the covariance of data signal $\underline{d}_m$ for user group m, $\underline{R}_{vv,i,m} = E\{\underline{v}_{i,m} \underline{v}_{i,m}^H\}$ is the covariance of total noise and interference vector $\underline{v}_{i,m}$, $E\{ \}$ denotes an expectation operation, and "H" denotes a conjugate transpose.

The data symbols in $\underline{d}_m$ may be assumed to be uncorrelated so that $\underline{R}_{dd,m} = I$. The total noise and interference $\underline{v}_{i,m}$ may be assumed to be AWGN so that $\underline{R}_{vv,i,m} = \sigma_{v,i,m}^2 I$, where $\sigma_{v,i,m}^2$ is the variance of the total noise and interference for user group m in iteration i. $\sigma_{v,i,m}^2$ may be estimated as described below.

Equation (18) may then be expressed as:

$$\hat{\underline{d}}_{i,m} = (\underline{T}_m^H \underline{T}_m + \sigma_{v,i,m}^2 I)^{-1} \underline{T}_m^H \underline{r}_{i,m} \quad \text{Eq (19)}$$

$$= \underline{Z}_{mmse,i,m} \underline{r}_{i,m}$$

where $\underline{Z}_{mmse,i,m} = (\underline{T}_m^H \underline{T}_m + \sigma_{v,i,m}^2 I)^{-1} \underline{T}_m^H$ is an MMSE data detection filter for user group m in iteration i. Equation (19) is derived from equation (18) using the matrix inverse lemma and the assumptions for $R_{dd,m}$ and $R_{vv,i,m}$ described above.

Data detection may also be performed for user group m based on the least squares technique, as follows:

$$\hat{\underline{d}}_{i,m} = (\underline{T}_m^H \underline{T}_m)^{-1} \underline{T}_m^H \underline{r}_{i,m} \quad \text{Eq (20)}$$

$$= \underline{Z}_{ls,i,m} \underline{r}_{i,m}$$

where $\underline{Z}_{ls,i,m} = (\underline{T}_m^H \underline{T}_m)^{-1} \underline{T}_m^H$ is a least squares data detection filter for user group m in iteration i.

Figure 6:
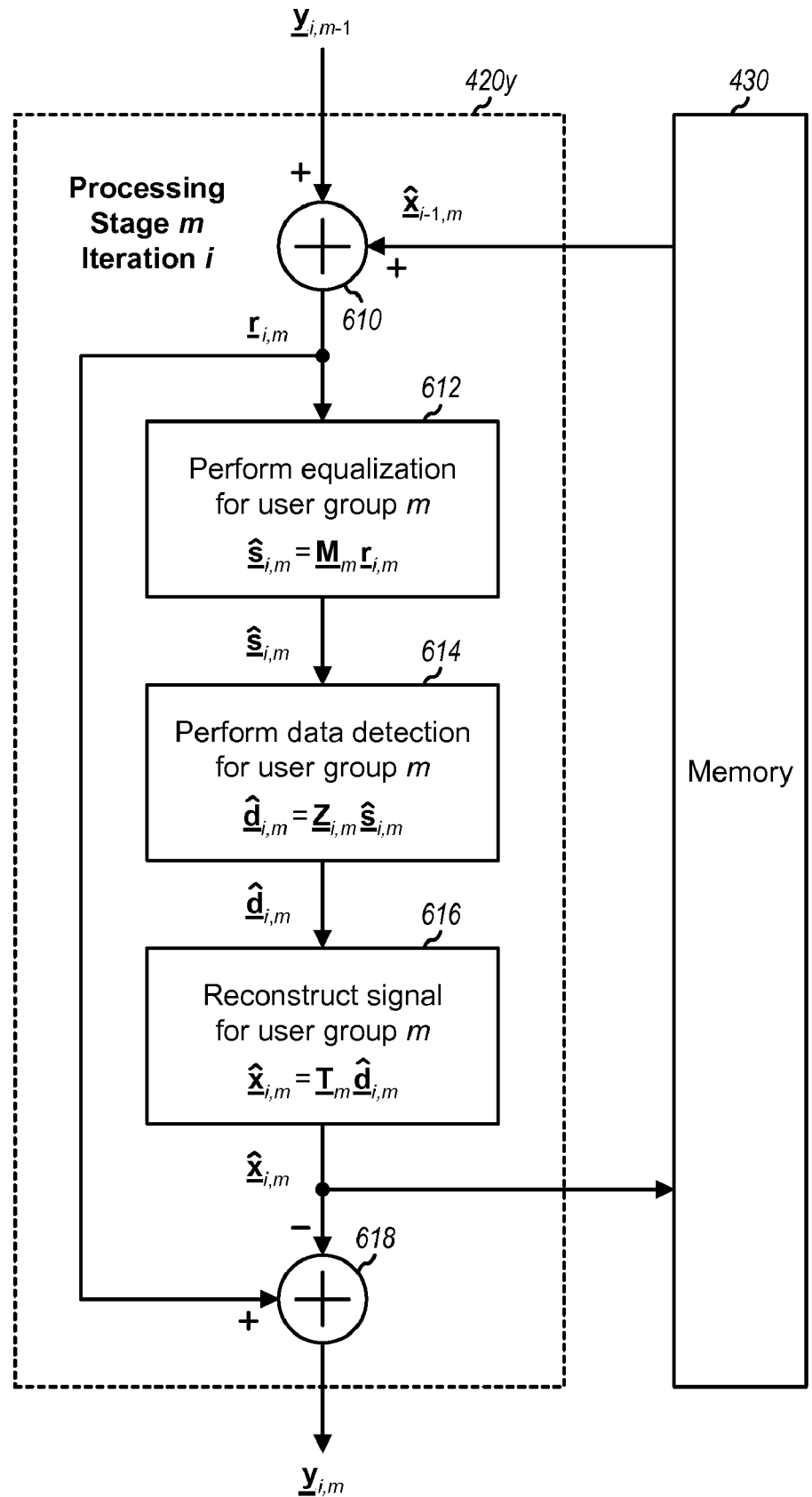
FIG. 6 shows a stage that performs equalization, detection and cancellation.

FIG. 6 shows an embodiment of a stage 420y that performs equalization, detection and cancellation. Stage 420y may also be used for each of the M stages 420a through 420M in FIG. 4. In the following description, stage 420y is referred to as stage m and performs processing for user group m.

Within stage m, a summer 610 receives the input signal $\underline{y}_{i,m-1}$ and the reconstructed signal $\hat{\underline{x}}_{i-1,m}$, sums the two signals, and provides the reconstituted signal $\underline{r}_{i,m}$ for stage m. A block 612 performs equalization on the reconstituted signal $\underline{r}_{i,m}$ and provides an equalized signal $\hat{\underline{s}}_{i,m}$ for user group m. A block 614 performs data detection on the equalized signal and provides the detected signal $\hat{d}_{i,m}$ for user group m. A block 616 reconstructs the signal for user group m based on the detected signal and provides the reconstructed signal $\hat{x}_{i,m}$ for user group m. A summer 618 subtracts the reconstructed signal from the reconstituted signal and provides the output signal $y_{i,m}$ for stage m.

Equalization may be performed using linear MMSE, least squares, or some other equalization technique. A equalizer matrix may be derived based on the linear MMSE technique, as follows:

$$\underline{M}_{mmse,i,m} = [\underline{H}_m^H \underline{H}_m + \sigma_{v,i,m}^2 \underline{I}]^{-1} \underline{H}_m^H, \qquad \text{Eq (21)}$$

where $M_{mmse,i,m}$ is an MMSE equalizer matrix for user group m in iteration i. $H_m$ may be estimated based on the pilot received from the sector(s) for user group m. $M_{mmse,i,m}$ is a function of $\sigma_{v,i,m}^2$ and may be different for different iterations.

A equalizer matrix may also be derived based on the least squares technique, as follows:

$$\underline{M}_{ls,m} = [\underline{H}_m^H \underline{H}_m]^{-1} \underline{H}_m^H, \qquad \text{Eq (22)}$$

where $M_{ls,m}$ is a least squares equalizer matrix for user group m.

Equalization may be performed for user group m as follows:

$$\begin{aligned}\hat{s}_{i,m} &= \underline{M}_{i,m} r_{i,m} \\ &= \underline{M}_{i,m} (\underline{T}_m \underline{d}_m + \underline{v}_{i,m}) \\ &= \underline{M}_{i,m} \underline{T}_m \underline{d}_m + \underline{V}_{i,m} \\ &= \underline{M}_{i,m} \underline{H}_m \underline{A}_m \underline{d}_m + \underline{V}_{i,m}\end{aligned} \qquad \text{Eq (23)}$$

where $M_m$ is an equalizer matrix for user group m,
$V_{i,m}$ is a matrix of total noise and interference for user group m, and
$\hat{s}_{i,m}$ is an equalized signal for user group m in iteration i. Equalizer matrix $M_{i,m}$ may be derived using the linear MMSE or least squares technique. $\hat{s}_{i,m}$ is an estimate of data signal $s_m$ for user group m.

Equation (23) may be approximated as follows:

$$\hat{s}_{i,m} \approx \underline{A}_m \underline{d}_m + \underline{V}_{i,m}. \qquad \text{Eq (24)}$$

The total noise and interference $V_{i,m}$ may be expressed as:

$$\underline{V}_{i,m} = \underline{M}_{i,m} \underline{v}_{i,m}. \qquad \text{Eq (25)}$$

Data detection may be performed on the equalized signal using linear MMSE, least squares, or some other data detection technique. Data detection may be performed for user group m based on the linear MMSE technique, as follows:

$$\begin{aligned}\hat{\underline{d}}_{i,m} &= (\underline{A}_m^H \underline{A}_m + \underline{R}_{vv,i,m})^{-1} \underline{A}_m^H \hat{\underline{s}}_{i,m} \\ &= (\underline{G}_m^H \underline{W}^H \underline{C}_m^H \underline{C}_m \underline{W} \underline{G}_s + \underline{R}_{vv,i,m})^{-1} \underline{A}_m^H \hat{\underline{s}}_{i,m} \\ &= (N \underline{G}_m^H \underline{G}_m + \underline{R}_{vv,i,m})^{-1} \underline{A}_m^H \hat{\underline{s}}_{i,m}\end{aligned} \qquad \text{Eq (26)}$$

where $R_{vv,i,m}$ is a covariance matrix for the total noise and interference $V_{i,m}$. Gain matrix $G_m$ and covariance matrix $R_{vv,i,m}$ may be determined as described below.

The total noise and interference matrix $V_{i,m}$ may be approximated as white. Data detection may then be performed as follows:

$$\begin{aligned}\hat{\underline{d}}_{i,m} &= (N \underline{G}_m^H \underline{G}_m + diag(\underline{R}_{vv,i,m}))^{-1} \underline{A}_m^H \hat{\underline{s}}_{i,m} \\ &= \underline{Z}_{mmse,i,m} \hat{\underline{s}}_{i,m}\end{aligned} \qquad \text{Eq (27)}$$

where $Z_{mmse,i,m} = (NG_m^H G_m + diag(R_{vv,i,m}))^{-1} A_m^H$. $Z_{mmse,i,m}$ is an MMSE data detection filter for user group m with the approximation of $V_{i,m}$ as white. Since $(NG_m^H G_m + diag(R_{vv,i,m}))$ is a diagonal matrix, the inverse operation becomes simple scalar operation, and the matrix inversion in equation (26) can be avoided.

Data detection may also be performed for user group m based on the least squares technique, as follows:

$$\hat{\underline{d}}_{i,m} = \underline{A}_m^H \hat{\underline{s}}_{i,m}, \qquad \text{Eq (28)}$$

where $A_m^H$ is a least squares data detection filter for user group m.

In the embodiments shown in FIGS. 5 and 6, the reconstructed signal $\hat{x}_{i,m}$ is stored in memory 430 and provided to summer 510 or 610 in the next iteration. In another embodiment, the detected signal $\hat{d}_{i,m}$ is stored in memory 430 and used to generate the reconstructed signal $\hat{x}_{i,m}$ in the next iteration. Storing the detected signal $\hat{d}_{i,m}$ utilizes less memory. However, storing the reconstructed signal $\hat{x}_{i,m}$ avoids the regeneration of $\hat{x}_{i,m}$ from $\hat{d}_{i,m}$.

The forward link signal transmitted by a given sector may reach the wireless device via one or more signal paths. These signal paths may include a line-of-sight path and/or reflected paths, which are created by reflections of radio waves in the environment. The multipath effect causes ISI, which is a phenomenon in which a data symbol in a received signal is smeared over time and acts as distortion to one or more other symbols in the received signal Data for the previous, current, and next symbol periods may be processed concurrently in order to capture and remove ISI. The received signal may then be expressed as:

$$\underline{y} = [\underline{T}_p \underline{T}_c \underline{T}_n] [\underline{d}_p \underline{d}_c \underline{d}_n]^T + \underline{n}, \qquad \text{Eq (29)}$$

where $d_p$, $d_c$ and $d_n$ are data vectors for three symbol periods, and
$T_p$, $T_c$ and $T_n$ are system matrices for three symbol periods.
Data vector $d_c$ includes data symbols for all users in all K sectors for the current symbol period ("c"). System matrix $T_c$ covers all users in all K sectors for the current symbol period. Similarly, $d_p$ and $T_p$ cover all users for the prior symbol period ("p"), and $d_n$ and $T_n$ cover all users for the next symbol period ("n").

Equation (29) indicates that a three fold increase in the column space of the system matrix and a corresponding increase in computational complexity will result from considering the previous, current, and next symbol periods concurrently.

In an embodiment, which is referred to as causal cancellation, the detected symbols for the previous symbol period are subtracted from the received signal prior to the iterative processing. This embodiment mitigates computational increase while accounting for ISI due to the previous symbol. The detected symbols for symbol period t may be stored and used in the next symbol period t+1. In symbol period t+1, the stored detected symbols for the previous symbol period t may be subtracted from the input signal, as follows:

$$\underline{y}_c = \underline{y} - \underline{T}_p \hat{\underline{d}}_p \approx [\underline{T}_c \underline{T}_n] [\underline{d}_c \underline{d}_n]^T + \underline{n}_c, \qquad \text{Eq (30)}$$

where $\hat{d}_p$ is a vector of detected symbols for all users for the prior symbol period, and
$y_c$ is a received signal with causal cancellation.

In another embodiment, which is referred to as causal and non-causal cancellation, the detected symbols for the previous, current, and next symbol periods are subtracted from the received signal prior to the iterative processing. One round of processing may be performed, e.g., on the received signal $\underline{y}_c$ with causal cancellation, to obtain detected symbols for all symbol periods of interest, which may be stored in memory. A received signal with causal and non-causal cancellation may be obtained as:

$$\underline{y}_{cn} = \underline{y} - \underline{T}_p \hat{\underline{d}}_p - \underline{T}_n \hat{\underline{d}}_n \approx \underline{T}_c \underline{d}_c + \underline{v}_{i,m}, \qquad \text{Eq (31)}$$

where $\hat{\underline{d}}_p$ is a vector of detected symbols for all users for the prior symbol period, and $\underline{y}_{cn}$ is a received signal with causal and non-causal cancellation.

In the second round of processing, for the current symbol period, the detected symbols $\hat{\underline{d}}_p$ obtained in this round for the prior symbol period and the detected symbols $\hat{\underline{d}}_c$ and $\hat{\underline{d}}_n$ obtained in the first round for the current and next symbol period are subtracted from the received signal to obtain $\underline{y}_{cn}$. Iterative processing is then performed on $\underline{y}_{cn}$ to obtain detected symbols $\hat{\underline{d}}_c$ for the current symbol period. $\hat{\underline{d}}_c$ is subtracted from the received signal in the next symbol period.

Figure 7:
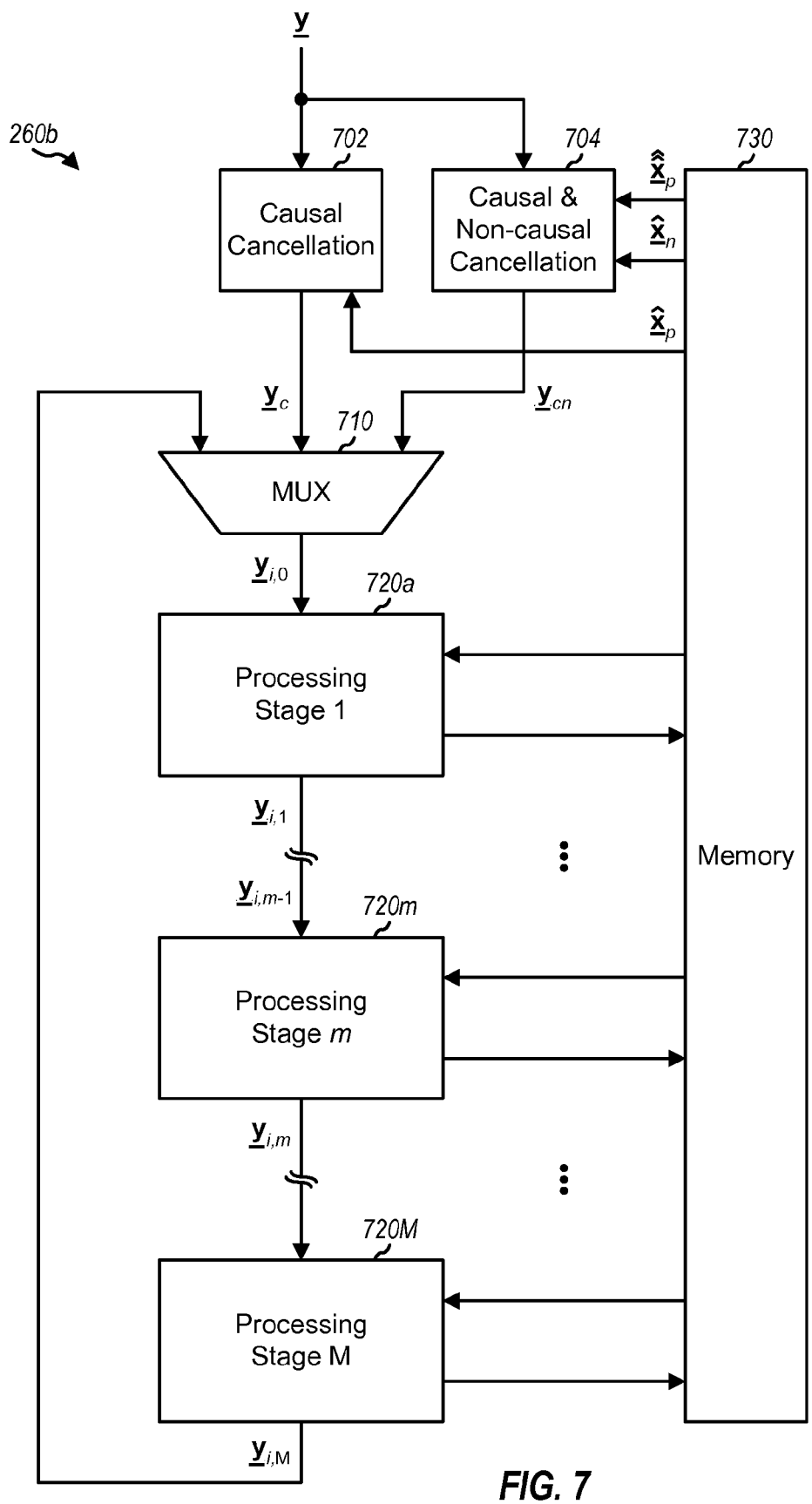
FIG. 7 shows a processor for iterative detection and cancellation with causal and non-causal cancellation.

FIG. 7 shows a block diagram of a processor 260b for iterative detection and cancellation with causal and non-causal cancellation, which is another embodiment of processor 260 in FIG. 2. For the first round, a block 702 performs causal cancellation on the received signal $\underline{y}$ based on the reconstructed signal $\hat{\underline{x}}_p = \underline{T}_p \hat{\underline{d}}_p$ from a memory 730, e.g., as shown in equation (30), and provides the received signal $\underline{y}_c$ with causal cancellation. For the second round, a block 704 performs causal and non-causal cancellation on the received signal based on the reconstructed signals $\hat{\underline{x}}_p = \underline{T}_p \hat{\underline{d}}_p$ and $\hat{\underline{x}}_n = \underline{T}_n \hat{\underline{d}}_n$ from memory 730, e.g., as shown in equation (31), and provides the received signal $\underline{y}_{cn}$ with causal and non-causal cancellation.

A multiplexer 710 is provided with the received signal $\underline{y}_c$ from block 702 on one input, the received signal $\underline{y}_{cn}$ from block 704 on another input, and the output signal $\underline{y}_{i,M}$ from the last stage 720M on a third input. Multiplexer 710 provides the received signal $\underline{y}_c$ for the first iteration of the first round, the received signal $\underline{y}_{cn}$ for the first iteration of the second round, and the output signal $\underline{y}_{i,M}$ for each subsequent iteration. Processing stages 720a through 720M process the signal from multiplexer 710 as described above. For example, each processing stage 720 may be implemented as shown in FIG. 5 or 6. Memory 730 stores the detected signal and/or the reconstructed signal and provides these signals to block 702, block 704, and stages 720 as appropriate.

In each iteration, the M user groups may be processed sequentially from the strongest user group to the weakest user group. This may improve detection performance for each user group since the signals from stronger user groups (if any) have been canceled. The user groups may also be processed in other orders. In general, the sequential processing of the user groups may result in the signal quality progressively improving for each subsequently processed user group, since the interfering signals from earlier processed user groups have been removed.

The wireless device may desire to recover a signal from a single sector. In an embodiment, the user group containing the desired signal is processed in the last stage after canceling the signals from other user groups. In another embodiment, the M user groups are processed from strongest to weakest, as described above. If the desired user group is not the last user group that is processed, then reconstructed signal for the desired user group may be added back to the output signal from the last stage to obtain the reconstituted signal for the desired user group. The reconstituted signal may then be processed to detect the desired signal.

The wireless device may desire to recover signals from multiple sectors, e.g., for soft handoff. In an embodiment, the user groups containing the desired signals from these sectors are processed in the last few stages after canceling the signals from other user groups. In another embodiment, the M user groups are processed from strongest to weakest, as described above. For each desired user group, the reconstructed signal for that user group may be added back to the output signal from the last stage, and the reconstituted signal may be processed to recover the signal from that user group.

The successive processing of the M user groups, one user group at a time, may have certain advantages. First, the size of the vectors and matrices for one user group may be much smaller than the size of the vectors and matrices for all users in full multi-user detection (MUD). Second, the successive processing of the M user groups may result in the signal quality progressively improving for each subsequently processed user group. The iterative processing of the M user groups further improves detection performance.

In equation (19), the variance of the total noise and interference, $\sigma_{v,i,m}^2$, for user group m in iteration i may be estimated as follows. The total received power at the wireless device, $P_{total\_rx}$, may be expressed as:

$$P_{total\_rx} = \sum_{k=1}^{K}\left(\sum_{i} h_{k,i}^2 \cdot \sum_{n=1}^{N} g_{k,n}^2\right) + \sigma_n^2 = \sum_{k=1}^{K}\sum_{i}\sum_{n=1}^{N} h_{k,i}^2 \cdot g_{k,n}^2 + \sigma_n^2, \qquad \text{Eq (32)}$$

where $h_{k,i}$ is a channel gain for signal path i of sector k. Each sector may be associated with any of number of signal paths at the wireless device, depending on the wireless environment.

For each stage m in the first iteration, the powers of the user groups processed by the prior stages have been removed (albeit not perfectly), and the power of the user group being processed by stage m is not part of the noise power. The total received power may be expressed as:

$$P_{total\_rx} = P_{prior\_stages} + P_{current\_stage} + P_{later\_stages}, \qquad \text{Eq (33)}$$

where $P_{prior\_stages}$, $P_{current\_stage}$, and $P_{later\_stages}$ are the powers of the user groups processed by the prior, current, and later stages, respectively. $P_{later\_stages}$ may also include the powers of groups that are not processed. The powers may be different between the first iteration and each subsequent iteration.

Ideally, $\sigma_{v,1,m}^2 = P_{later\_stages} + \sigma_n^2$ since the powers of the prior stages have been removed. $\sigma_{v,1,m}^2$ may then be expressed as:

$$\sigma_{v,1,m}^2 = \sum_{k \in K_m}\sum_{n \in N_m} h_k^2 \cdot g_{k,n}^2 + \sigma_n^2, \qquad \text{Eq (34)}$$

where $K_m$ and $N_m$ include all user groups processed by later stages.

For each subsequent iteration, $\sigma_{v,i,m}^2$ is determined by the residual errors $e_{i,j}$ for user groups 1 through m−1 from the current iteration i as well as the residual errors $e_{i-1,j}$ for user groups m+1 through M from the prior iteration i−1.

The thermal noise $\sigma_n^2$ in equation (34) may be expressed as:

$$\sigma_n^2 = P_{total\_rx} - \sum_{k=1}^{K}\sum_{n=1}^{N} h_k^2 \cdot g_{k,n}^2 = E\{\underline{y}\,\underline{y}^H\} - \sum_{k=1}^{K}\sum_{n=1}^{N} h_k^2 \cdot g_{k,n}^2. \quad \text{Eq (35)}$$

In equations (26) and (27), covariance matrix $\underline{R}_{vv,i,m}$ may be estimated as follows. Equation (23) may be rewritten as:

$$\underline{\hat{s}}_{i,m} = \underline{B}_{i,m} + \underline{V}_{i,m}, \quad \text{Eq (36)}$$

where $\underline{B}_{i,m} = \underline{M}_{i,m}\underline{H}_m\underline{A}_m\underline{d}_m$. The covariances of $\underline{\hat{s}}_{i,m}$, $\underline{B}_{i,m}$ and $\underline{V}_{i,m}$ may be expressed as:

$$\underline{R}_{ss,i,m} = \underline{R}_{bb,i,m} + \underline{R}_{vv,i,m}. \quad \text{Eq (37)}$$

The covariance of $\underline{\hat{s}}_{i,m}$ may be expressed as:

$$\underline{R}_{ss,i,m} = E\{\underline{\hat{s}}_{i,m}\underline{\hat{s}}_{i,m}^H\}, \quad \text{Eq (38)}$$

$\underline{R}_{ss,i,m}$ may be estimated by computing the outer product of $\underline{\hat{s}}_{i,m}$ and averaging over multiple symbol periods.

The covariance of $\underline{B}_{i,m}$ may be estimated as:

$$\underline{R}_{bb,i,m} = E\{\underline{M}_{i,m}\underline{H}_m\underline{A}_m\underline{A}_m^H\underline{H}_m^H\underline{M}_{i,m}^H\}. \quad \text{Eq (39)}$$

$\underline{A}_m$, $\underline{H}_m$ and $\underline{M}_{i,m}$ may be estimated and used to derive $\underline{R}_{bb,i,m}$.

The covariance of $\underline{V}_{i,m}$ may then be expressed as:

$$\underline{R}_{vv,i,m} = E\{\underline{V}_{i,m}\underline{V}_{i,m}^H\} = \underline{R}_{ss,i,m} - \underline{R}_{bb,i,m}. \quad \text{Eq (40)}$$

The gain of each user (or code channel) in each sector may be estimated and used to form the gain matrix $\underline{G}_m$ for each user group. To estimate the gains, received signal $\underline{y}$ may be processed as follows:

$$\underline{q}_k = \underline{W}^H \underline{C}_k^H \underline{H}_k^H \underline{y} \quad \text{Eq (41)}$$

$$= \underline{W}^H \underline{C}_k^H \underline{H}_k^H \left( \underline{H}_k \underline{C}_k \underline{W} \underline{G}_k \underline{d}_k + \sum_{j=1, j\neq k}^{K} \underline{H}_j \underline{C}_j \underline{W} \underline{G}_j \underline{d}_j + \underline{n} \right)$$

$$= \underline{\Omega}_k \underline{G}_k \underline{d}_k + \underline{v}_k$$

where $\underline{\Omega}_k = \underline{W}^H \underline{C}_k^H \underline{H}_k^H \underline{H}_k \underline{C}_k \underline{W}$, $\underline{v}_k$ is a vector of noise and interference for sector k, and $\underline{q}_k$ is a vector of decovered symbols for sector k.

The elements of $\underline{q}_k$ may be expressed as:

$$E\{|q_{k,n}|^2\} = |\alpha_{k,n}|^2 g_{k,n}^2 + \sigma_{v,k}^2, \quad \text{Eq (42)}$$

where $q_{k,n}$ is the n-th element of $\underline{q}_k$, $\alpha_{k,n}$ and $g_{k,n}$ are the n-th diagonal elements of $\underline{\Omega}_k$ and $\underline{G}_k$, respectively, and $\sigma_{v,k}^2$ is the variance of $\underline{v}_k$.

The square operation and expectation in equation (42) removes the data symbols in $\underline{d}_k$, which are assumed to be uncorrelated.

The noise and interference variance $\sigma_{v,k}^2$ may be estimated by taking the difference of $q_{k,pilot}$ for the pilot channel for consecutive symbol periods, computing the squared magnitude of the difference, and filtering the squared magnitude to obtain the estimate of $\sigma_{v,k}^2$. The estimated $\sigma_{v,k}^2$ may then be subtracted from $E\{|q_{k,n}|^2\}$ to obtain an estimate of $|\alpha_{k,n}|^2 g_{k,n}^2$, as follows:

$$G_{k,n} = E\{|q_{k,n}|^2\} - \sigma_{v,k}^2 = |\alpha_{k,n}|^2 g_{k,n}^2, \quad \text{Eq (43)}$$

where $G_{k,n}$ is a scaled power gain for code channel n.

Scaled gains for the code channels may then be derived as follows:

$$\frac{g_{k,n}}{g_{k,pilot}} = \sqrt{\frac{G_{k,n}}{G_{k,pilot}}}, \quad \text{Eq (44)}$$

where $g_{k,pilot}$ and $G_{k,pilot}$ are the gain and the power gain, respectively, of the pilot channel for sector k.

In equation (44), the gains of the code channels are given relative to the gain $g_{k,pilot}$ of the pilot channel. This is a desired form since the channel response matrix $\underline{H}_k$ is also derived based on the pilot and includes the gain $g_{k,pilot}$ of the pilot channel, which would be canceled by the scaled gains from equation (44).

The processing shown in equations (43) to (44) may be performed for each sector. The gain matrix $\underline{G}_m$ for each user group may be formed based on the gains estimated for the users in that group.

Figure 8:
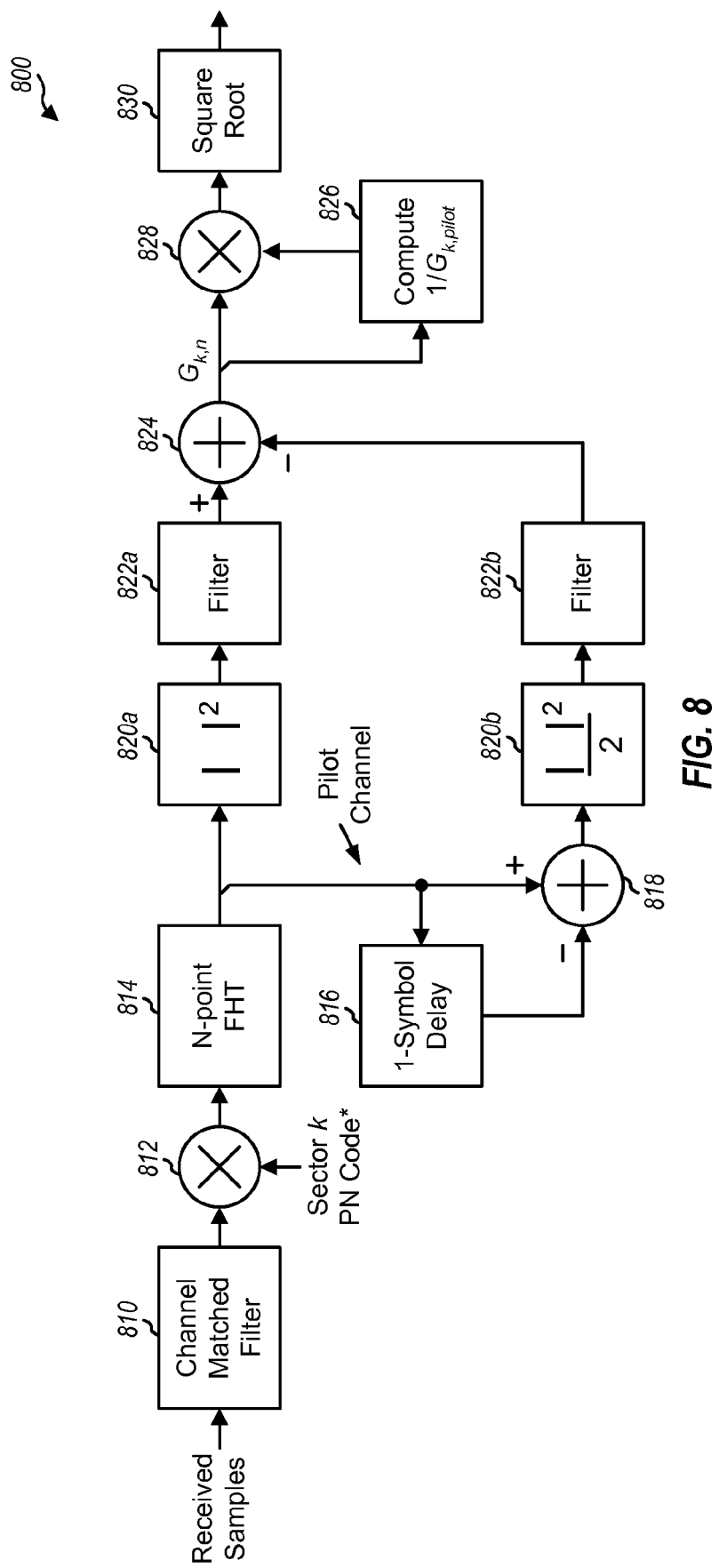
FIG. 8 shows a code channel gain estimation unit.

FIG. 8 shows a block diagram of a code channel gain estimation unit 800. FIG. 8 shows the processing to estimate the gains of the N code channels for one sector k. Within gain estimation unit 800, a unit 810 performs channel matched filtering and multiplies the received samples in $\underline{y}$ with the complex conjugated channel gains in $\underline{H}_k$ for sector k. A multiplier 812 multiplies the output of unit 810 with the complex conjugated PN chips for sector k and provides despread samples. A unit 814 performs an N-point fast Hadamard transform (FHT) on N despread samples for each symbol period and provides N decovered symbols for N code channels, which are the N elements of $\underline{q}_k$. Unit 814 efficiently performs Walsh decovering for all N code channels.

A unit 820a computes the squared magnitude of the decovered symbol for each code channel. A filter 822a filters the output of unit 820a for each code channel. The output of filter 822a is an estimate of the expected value in equation (42).

The noise and interference variance is estimated based on the decovered symbols for the pilot channel. A unit 816 provides one symbol period of delay for each decovered symbol for the pilot channel. A summer 818 subtracts the delayed decovered symbol from the current decovered symbol and provides the difference. Since the pilot symbol is constant, taking the difference removes the pilot modulation while capturing the noise and interference, which are assumed to be random from symbol period to symbol period. A unit 820b computes the squared magnitude of the difference from summer 818 and further divides the result by two to account for the difference operation by summer 818. A filter 822b filters the output of unit 820b and provides the estimated noise and interference variance $\sigma_{v,k}^2$.

A unit 824 subtracts the noise and interference variance from the output of filter 822a and provides the scaled power gain $G_{k,n}$ for each code channel. A unit 826 determines a scaling factor $1/G_{k,pilot}$ based on the scaled power gain $G_{k,pilot}$ for the pilot channel. A multiplier 828 multiplies the scaled power gain for each code channel with the scaling factor and provides $G_{k,n}/G_{k,pilot}$ for each code channel. A unit 830 computes the square root of $G_{k,n}/G_{k,pilot}$ for each code channel and provides the scaled gain $g_{k,n}/g_{k,pilot}$ for that code channel.

The received power for each code channel may be determined based on the scaled gain $g_{k,n}$ for that code channel and the received power for sector k, as follows:

$$P_{k,n} = \left(\frac{g_{k,n}}{g_{k,pilot}}\right)^2 P_{k,pilot}, \quad \text{Eq (45)}$$

where $P_{k,pilot}$ is the received pilot power for sector k, and
$P_{k,n}$ is the received power for code channel n of sector k.

Figure 9:
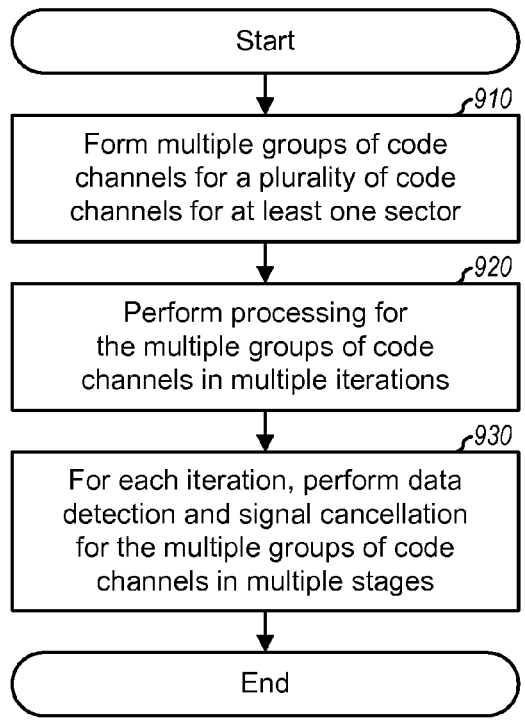
FIG. 9 shows a process for performing iterative detection and cancellation.

FIG. 9 shows an embodiment of a process 900 for performing iterative detection and cancellation. Multiple groups of code channels are formed for a plurality of code channels for at least one sector (block 910). Each group may include all code channels for one sector (for sector-based processing), a subset of all code channels for one sector (for local processing), or multiple code channels for multiple sectors (for global processing). Processing is performed for the multiple groups of code channels in multiple iterations (block 920). For each iteration, data detection and signal cancellation are performed for the multiple groups of code channels in multiple stages, e.g., in a sequential order starting with the first group having the strongest received powers and concluding with the last group having the weakest received powers (block 930).

Figure 10:
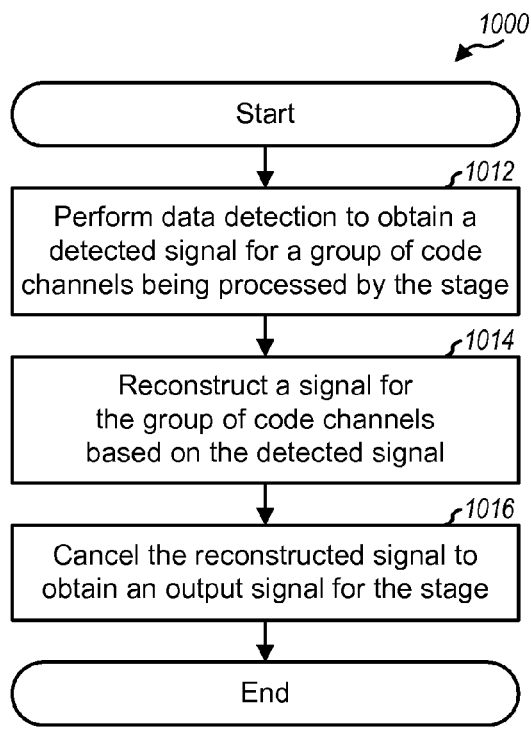
FIG. 10 shows a detection and cancellation process for one stage.

FIG. 10 shows an embodiment of a detection and cancellation process 1000 performed by one stage in one iteration. Process 1000 may be used for block 930 in FIG. 9. Data detection is performed to obtain a detected signal for a group of code channels being processed by the stage (block 1012). A signal for the group of code channels is reconstructed based on the detected signal (block 1014). The reconstructed signal is canceled to obtain an output signal for the stage (block 1016).

For the data detection in block 1012, a system matrix may be determined for the group of code channels. The variance of noise and interference for the group of code channels may also be estimated. A data detection filter for the group of code channels may then be derived based on the system matrix and possibly the variance of the noise and interference, e.g., in accordance with the linear MMSE or least squares technique as shown in equation (19) or (20), respectively. Data detection is then performed with the data detection filter to obtain the detected signal for the group of code channels, e.g., as shown in equation (19) or (20).

Figure 11:
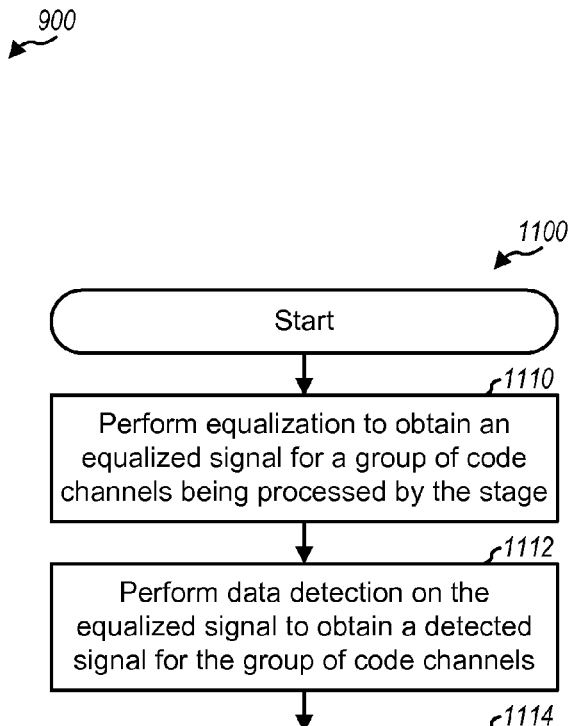
FIG. 11 shows an equalization, detection and cancellation process for one stage.

FIG. 11 shows an embodiment of an equalization, detection and cancellation process 1100 performed by one stage in one iteration. Process 1100 may also be used for block 930 in FIG. 9. Equalization is performed to obtain an equalized signal for a group of code channels being processed by the stage (block 1110). Data detection is then performed on the equalized signal to obtain a detected signal for the group of code channels (block 1112). A signal for the group of code channels is reconstructed based on the detected signal (block 1114). The reconstructed signal is canceled to obtain an output signal for the stage (block 1116).

For the equalization in block 1110, an equalizer matrix may be derived for the group of code channels, e.g., in accordance with the linear MMSE or least squares technique as shown in equation (21) or (22), respectively. Equalization is then performed with the equalizer matrix to obtain the equalized signal.

For the data detection in block 1112, a gain matrix may be estimated for the group of code channels. The covariance of the noise and interference for the group of code channels may also be estimated. A data detection filter for the group of code channels may then be derived based on the gain matrix and possibly the covariance of the noise and interference, e.g., in accordance with the linear MMSE or least squares technique as shown in equation (27) or (28), respectively. Data detection is then performed with the data detection filter to obtain the detected signal for the group of code channels, e.g., as shown in equation (27) or (28).

For process 1000 in FIG. 10 and process 1100 in FIG. 11, for each subsequent iteration after the first iteration, a reconstructed signal obtained in a prior iteration for the group of code channels may be added back to an input signal for the stage to obtain a reconstituted signal. Data detection and signal cancellation may then be performed for the group of code channels based on the reconstituted signal.

Back in FIG. 9, for causal cancellation, a signal for the prior symbol period may be removed from the received signal. The processing in blocks 920 and 930 may then be performed after removing the signal for the prior symbol period. For causal and non-causal cancellation, a signal for the prior symbol period and a signal for the next symbol period may be removed from the received signal. The processing in blocks 920 and 930 may then be performed after removing the signals for the prior and next symbol periods.

The techniques described herein may be implemented by various means. For example, these techniques may be implemented in hardware, firmware, software, or a combination thereof. For a hardware implementation, the processing units used to perform the processing described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 292 in FIG. 2) and executed by a processor (e.g., processor 290). The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus comprising:
at least one processor having multiple processing stages, configured to perform processing for multiple groups of code channels in multiple iterations and, for each iteration, to perform data detection and signal cancellation for each of the multiple groups of code channels in a respective one of said multiple processing stages;
wherein an output of each iteration for the multiple groups of code channels is input into a next following stage to be used to perform a next iteration.

2. The apparatus of claim 1, wherein for each stage of each iteration, the at least one processor is configured to perform data detection to obtain a detected signal for a group of code channels, to reconstruct a signal for the group of code channels based on the detected signal, and to cancel the reconstructed signal to obtain an output signal for the stage.

3. The apparatus of claim 2, wherein the at least one processor is configured to determine a system matrix for the group of code channels, to derive a data detection filter for the group of code channels based on the system matrix, and to perform data detection with the data detection filter to obtain the detected signal for the group of code channels.

4. The apparatus of claim 3, wherein the at least one processor is configured to estimate variance of noise and interference for the group of code channels and to derive the data detection filter further based on the variance of the noise and interference.

5. The apparatus of claim 3, wherein the at least one processor is configured to derive the data detection filter in accordance with linear minimum mean square error (MMSE) or least squares technique.

6. The apparatus of claim 1, wherein for each stage of each iteration, the at least one processor is configured to perform equalization to obtain an equalized signal for a group of code channels, to perform data detection on the equalized signal to obtain a detected signal for the group of code channels, to reconstruct a signal for the group of code channels based on the detected signal, and to cancel the reconstructed signal to obtain an output signal for the stage.

7. The apparatus of claim 6, wherein the at least one processor is configured to derive an equalizer matrix for the group of code channels and to perform equalization with the equalizer matrix to obtain the equalized signal.

8. The apparatus of claim 7, the at least one processor is configured to derive the equalizer matrix in accordance with linear minimum mean square error (MMSE) or least squares technique.

9. The apparatus of claim 6, wherein the at least one processor is configured to estimate a gain matrix for the group of code channels, to derive a data detection filter for the group of code channels based on the gain matrix, and to perform data detection on the equalized signal with the data detection filter to obtain the detected signal for the group of code channels.

10. The apparatus of claim 9, wherein the at least one processor is configured to estimate covariance of noise and interference for the group of code channels and to derive the data detection filter further based on the covariance of the noise and interference.

11. The apparatus of claim 1, wherein for each stage of each iteration after a first iteration, the at least one processor is configured to add a first signal obtained in a prior iteration for a group of code channels to an input signal to obtain a second signal, and to perform data detection and signal cancellation for the group of code channels based on the second signal.

12. The apparatus of claim 1, wherein the at least one processor is configured to remove a signal for a prior symbol period and to perform processing for the multiple groups of code channels in multiple iterations after removing the signal for the prior symbol period.

13. The apparatus of claim 1, wherein the at least one processor is configured to remove a signal for a prior symbol period and a signal for a next symbol period and to perform processing for the multiple groups of code channels in multiple iterations after removing the signals for the prior and next symbol periods.

14. The apparatus of claim 1, wherein for each of the multiple groups of code channels, the at least one processor is configured to obtain decovered symbols for the code channels in the group, to determine an averaged squared magnitude of the decovered symbols for each code channel in the group, and to determine a gain for each code channel in the group based on the averaged squared magnitude of the decovered symbols for the code channel.

15. The apparatus of claim 14, wherein for each of the multiple groups of code channels, the at least one processor is configured to estimate variance of noise and interference based on decovered symbols for a pilot channel, and to determine the gain for each code channel further based on the variance of the noise and interference.

16. The apparatus of claim 1, wherein the at least one processor is configured to determine received powers of a plurality of code channels for at least one sector, and to form the multiple groups of code channels based on the received powers.

17. The apparatus of claim 16, wherein the at least one processor is configured to perform data detection and signal cancellation for the multiple groups of code channels in a sequential order for each iteration, starting with a first group having strongest received powers and concluding with a last group having weakest received powers.

18. The apparatus of claim 1, wherein each group includes all code channels for one sector.

19. The apparatus of claim 1, wherein each group includes a subset of all code channels for one sector.

20. The apparatus of claim 1, wherein each group includes multiple code channels for multiple sectors.

21. A method comprising:
performing processing for multiple groups of code channels in multiple iterations; and performing data detection and signal cancellation for each of the multiple groups of code channels in a respective one of multiple stages for each iteration;
wherein an output of each iteration for the multiple groups of code channels is input into a next following stage to be used to perform a next iteration.

22. The method of claim 21, wherein the performing data detection and signal cancellation comprises, for each stage of each iteration,
performing data detection to obtain a detected signal for a group of code channels,
reconstructing a signal for the group of code channels based on the detected signal, and
canceling the reconstructed signal to obtain an output signal for the stage.

23. The method of claim 21, wherein the performing data detection and signal cancellation comprises, for each stage of each iteration,
performing equalization to obtain an equalized signal for a group of code channels,
performing data detection on the equalized signal to obtain a detected signal for the group of code channels,
reconstructing a signal for the group of code channels based on the detected signal, and
canceling the reconstructed signal to obtain an output signal for the stage.

24. The method of claim 21, wherein the performing data detection and signal cancellation comprises, for each stage of each iteration after a first iteration,
adding a first signal obtained in a prior iteration for a group of code channels to an input signal to obtain a second signal, and
performing data detection and signal cancellation for the group of code channels based on the second signal.

25. The method of claim 21, further comprising:
determining received powers of a plurality of code channels for at least one sector; and forming the multiple groups of code channels based on the received powers, and wherein the performing data detection and signal cancellation comprises performing data detection and signal cancellation for the multiple groups of code channels in a sequential order for each iteration, starting with a first group having strongest received powers and concluding with a last group having weakest received powers.

26. An apparatus comprising:

means for performing processing for multiple groups of code channels in multiple iterations; and means for performing data detection and signal cancellation for each of the multiple groups of code channels in a respective one of multiple stages for each iteration;

wherein an output of each iteration for the multiple groups of code channels is input into a next following stage to be used to perform a next iteration.

27. The apparatus of claim 26, wherein the means for performing data detection and signal cancellation comprises, for each stage of each iteration, means for performing data detection to obtain a detected signal for a group of code channels, means for reconstructing a signal for the group of code channels based on the detected signal, and means for canceling the reconstructed signal to obtain an output signal for the stage.

28. The apparatus of claim 26, wherein the means for performing data detection and signal cancellation comprises, for each stage of each iteration, means for performing equalization to obtain an equalized signal for a group of code channels, means for performing data detection on the equalized signal to obtain a detected signal for the group of code channels, means for reconstructing a signal for the group of code channels based on the detected signal, and means for canceling the reconstructed signal to obtain an output signal for the stage.

29. The apparatus of claim 26, wherein the means for performing data detection and signal cancellation comprises, for each stage of each iteration after a first iteration, means for adding a first signal obtained in a prior iteration for a group of code channels to an input signal to obtain a second signal, and means for performing data detection and signal cancellation for the group of code channels based on the second signal.

30. The apparatus of claim 26, further comprising:

means for determining received powers of a plurality of code channels for at least one sector; and means for forming the multiple groups of code channels based on the received powers, and wherein the means for performing data detection and signal cancellation comprises means for performing data detection and signal cancellation for the multiple groups of code channels in a sequential order for each iteration, starting with a first group having strongest received powers and concluding with a last group having weakest received powers.

31. A processor-readable memory including processor-executable instructions stored therein for performing a method comprising:

performing processing for multiple groups of code channels in multiple iterations; and performing data detection and signal cancellation for each of the multiple groups of code channels in a respective one of multiple stages for each iteration;

wherein an output of each iteration for the multiple groups of code channels is input into a next following stage to be used to perform a next iteration.

* * * * *